US012240484B1

(12) United States Patent
Shah et al.

(10) Patent No.: US 12,240,484 B1
(45) Date of Patent: Mar. 4, 2025

(54) VEHICLE OPERATION AND/OR SIMULATION DECISION REGISTRY

(71) Applicant: Zoox, Inc., Foster City, CA (US)

(72) Inventors: Prateek Chandresh Shah, San Francisco, CA (US); Rick Zhang, San Mateo, CA (US); Wentao Zhong, Foster City, CA (US); Jeremy Schwartz, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 693 days.

(21) Appl. No.: 17/184,559

(22) Filed: Feb. 24, 2021

(51) Int. Cl.
*B60W 60/00* (2020.01)
*B60W 40/04* (2006.01)
*G05B 13/02* (2006.01)
*G05B 17/02* (2006.01)
(Continued)

(52) U.S. Cl.
CPC .......... *B60W 60/001* (2020.02); *B60W 40/04* (2013.01); *G05B 13/0265* (2013.01); *G05B 17/02* (2013.01); *G06F 16/2272* (2019.01); *G07C 5/085* (2013.01)

(58) Field of Classification Search
CPC . B60W 60/001; B60W 40/04; G06F 16/2272; G05B 13/0265; G05B 17/02; G07C 5/085
See application file for complete search history.

(56) References Cited

U.S. PATENT DOCUMENTS

| 7,719,812 | B2 * | 5/2010 | Phadke | H02M 1/32 |
| | | | | 361/93.1 |
| 8,001,527 | B1 * | 8/2011 | Qureshi | G06F 11/079 |
| | | | | 717/172 |
| 9,501,878 | B2 * | 11/2016 | Palmer | G07C 5/0841 |

(Continued)

FOREIGN PATENT DOCUMENTS

| CN | 110321371 A | * | 10/2019 | ......... G06F 16/2465 |
| CN | 111414477 A | * | 7/2020 | ............ G01M 17/00 |
| WO | WO-2021063486 A1 | * | 4/2021 | ............ B60W 50/02 |

OTHER PUBLICATIONS

"Skliros, Christos et. al., A Review of Model Based and Data Driven Methods Targeting Hardware Systems Diagnostics; 2019; Diagnostyka; vol. 20, No. 1" (Year: 2019).*

(Continued)

*Primary Examiner* — Elaine Gort
*Assistant Examiner* — Christopher R Cardimino
(74) *Attorney, Agent, or Firm* — Lee & Hayes, P.C.

(57) ABSTRACT

Tracking perception and/or planning component decisions may comprise generating a data structure in association with an output determined by a component. This data structure, along with one or more data structures generated in association with other outputs generated by the same or different components of the vehicle, may be used to determine a trace that identifies component(s) that determined outputs that affected a particular component's generation of an output. This trace and/or factors identified by the data structure may be used to detect a problem with a component; identify a (Continued)

component or output therefrom that may be causing an error; determine a portion of a component that has been activated and a frequency associated therewith; and/or visualize operation of the vehicle associated with activation of particular components, among additional or alternate uses discussed herein.

21 Claims, 10 Drawing Sheets

(51) Int. Cl.
  *G06F 16/22* (2019.01)
  *G07C 5/08* (2006.01)

(56) References Cited

U.S. PATENT DOCUMENTS

| | | | |
|---|---|---|---|
| 10,001,778 B2 * | 6/2018 | Hu | G05D 13/00 |
| 10,372,567 B2 * | 8/2019 | Rensing | G06N 5/025 |
| 10,976,337 B2 * | 4/2021 | Chowdhary | G06F 1/163 |
| 11,334,831 B2 * | 5/2022 | Abu El Ata | G06F 17/10 |
| 11,721,142 B2 * | 8/2023 | Paty | G06F 11/079 |
| | | | 701/31.7 |
| 2007/0028220 A1 * | 2/2007 | Miller | G06F 18/2137 |
| | | | 717/124 |
| 2016/0203036 A1 * | 7/2016 | Mezic | G06F 11/0751 |
| | | | 714/819 |

OTHER PUBLICATIONS

"James, Ajith et. al.; Fault diagnosis of automobile systems using fault tree based on digraph modeling; Dec. 19, 2017; The Society for Reliability Engineering, Quality and Operations Management (SREQOM), India and The Division of Operation and Maintenance, Lulea University of Technology" (Year: 2017).*

* cited by examiner

VEHICLE OPERATION AND/OR SIMULATION DECISION REGISTRY

BACKGROUND

An autonomous vehicle may include highly complex systems for controlling operations of the vehicle. Such a system may comprise numerous hardware and/or software components, making it difficult to identify which component or components led to an error and/or how modifying a component will change how other components operate and how the autonomous vehicle is ultimately controlled. Something as simple as exchanging hardware for hardware of a same type or making a minor change to a software component may ultimately cause the autonomous vehicle to operate differently.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
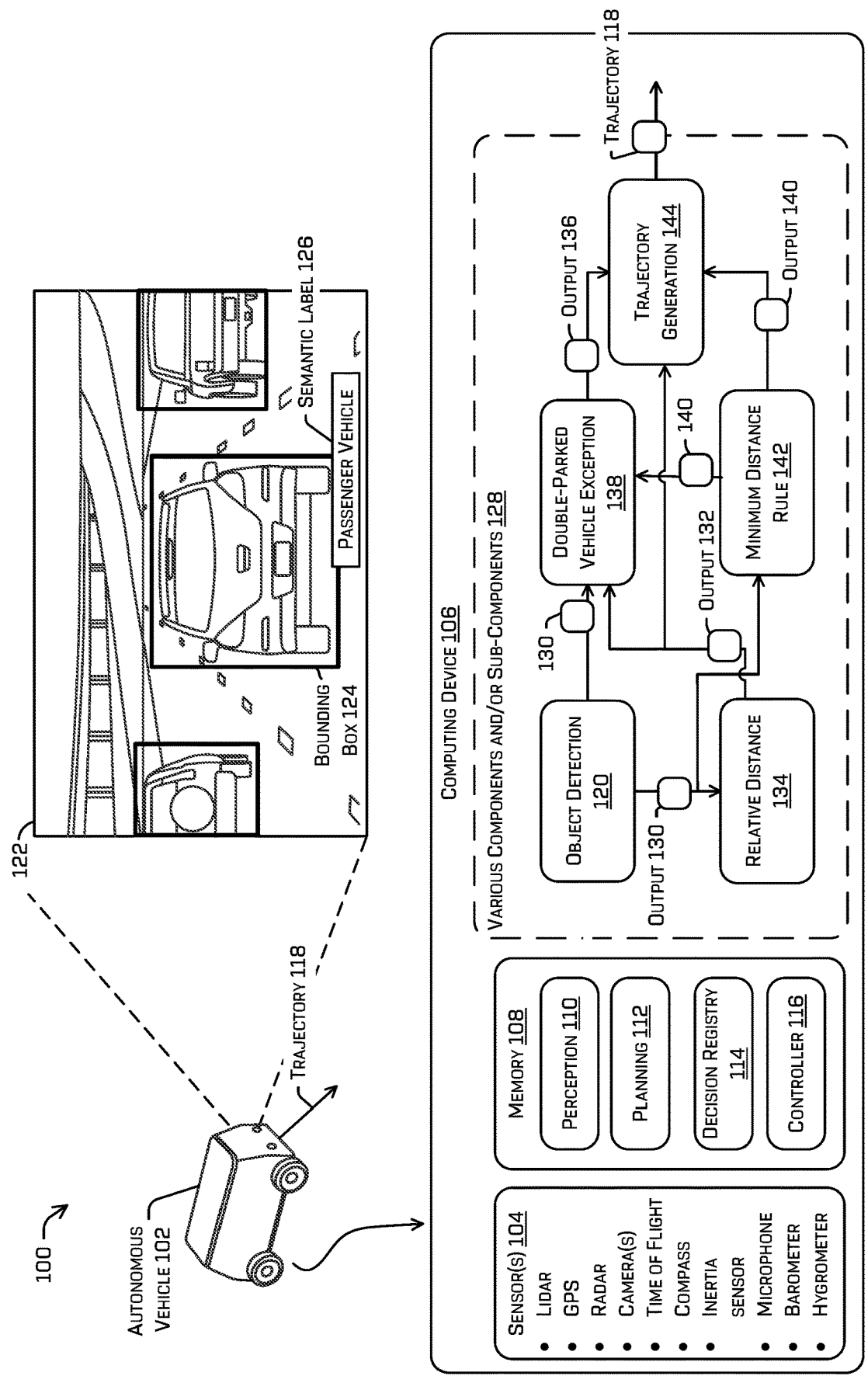
FIG. 1 illustrates an autonomous vehicle and an example scenario in which a component and its subcomponents are activated to accomplish trajectory generation, as an example.

Techniques (e.g., processes and/or machines) for tracking perception and/or planning component decisions may comprise generating a data structure in association with an output determined by a component. This data structure, along with one or more data structures generated in association with other outputs generated by the same or different components of the vehicle, may be used to determine a trace that identifies component(s) that determined outputs that affected a particular component's generation of an output. This trace and/or factors identified by the data structure may be used to detect a problem with a component, such as output flicker (e.g., when the output of the component toggles rapidly between conflicting states) or a failed attempt to correct a problem; identify a component or output therefrom that may be causing an error; determine a portion of a component that has been activated and a frequency associated therewith; and/or visualize operation of the vehicle associated with activation of particular components, among additional or alternate uses discussed herein.

These determinations may comprise any state or output determined by a component of an autonomous vehicle. For example, such an output by a component may include determining a distance at which to follow another vehicle, selecting a trajectory, joining sensor data of different types, and/or the like. In other words, at a high-level, the output may be determination/decision by a component regarding some portion of perception or control of the vehicle, however small and invisible to passengers or high-level and noticeable. Such determinations may be made by a high-level component, such as trajectory generation that guides the movement of the vehicle over near-time horizon (e.g., next 100 milliseconds, 500 milliseconds, 1 second, 3 seconds, any other number); or a low-level sub-component, such as determining a minimum distance to maintain from objects, determining a distance at which to follow another object, or determining whether or not two different portions of sensor data correspond with a same portion of an object. Such a component may include software and/or hardware and may comprise one or more sub-components, for which a data structure may also be generated. In some examples, a data structure generated according to the techniques discussed herein may be stored as an entry in a decision registry that may be stored as part of log data generated as part of operation of the autonomous vehicle. The decision registry may be used for simulated operation and/or real-world operation of the vehicle.

To track a component's determinations that may affect vehicle behavior or object detection, the techniques discussed herein may include a module within a component that determines the data structure in response to the component generating a determination. This module may be software and/or hardware. In an additional or alternate example, the module may be an application programming interface (API) or another type of software and/or hardware layer that receives outputs of the component(s) to be tracked and generates a data structure in response to receiving such outputs. For example, the module may be part of a publication-subscription network where the module is a subscriber to messages published by components that are being tracked.

The data structure generated in association with a determination may identify the output(s) of one or more components upon which the determination was based, a course identifier of the source of the need for the determination, a fine identifier of the source, a coarse result type, a fine result type, one or more factors, and/or a time associated with the determination. The one or more factors identified by a data structure may be different depending on the component and/or output that generated the determination. A factor may identify a common name for the factor in plain language, a value associated with the factor, a limit associated with the factor, and/or a reason associated with the factor. A factor may also be referred to herein as ancillary data.

To give an illustration, the component might be a sub-component of the planning component of an autonomous vehicle for handling double-parked vehicles—a "double-parked vehicle exception component." More specifically, this sub-component may output an indication that an exception may or may not be made that would allow a trajectory generation component to generate a trajectory into a lane associated with oncoming traffic, such as when a double-parked vehicle is likely detected and other parameters, such as a threshold distance to the double-parked vehicle, are satisfied. In generating such a determination, the exception component may receive any object detection (or an indication that no object has been detected), an estimated distance to an object detection, a threshold distance to maintain from the object, and/or the like from other components of the perception system and/or the planning system of the autonomous vehicle.

In a first instance, the component may generate a determination that no exception should be made based on receiving a likelihood that no double-parked vehicle exists from a detection component of the perception system, receiving a likelihood that meets or exceeds a threshold that a drive corridor of the autonomous vehicle is clear, and/or determining that a distance to a double-parked vehicle hasn't been reached. According to the latter example, another component may have determined a threshold distance to maintain from any double-parked vehicles based at least in part on sensor data and output this threshold distance to the exception component. The techniques discussed herein may comprise generating a data structure associated with the determination to output an indication that no exception should be made. In this instance, the data structure may include an indication of the components that the exception component received input from, an indication of which components' inputs were relied upon in making the determination (e.g., in an example where no object detection exists, output from the threshold determining component may not matter for this determination or in another example where the vehicle is beyond the threshold distance from the double-parked vehicle, how the determination was made (e.g., the estimated distance to the object exceeded the threshold), and/or the like.

The data structure may be stored in a decision registry, which may be stored with other log data generated by the vehicle in some examples. A particular entry in the decision registry (i.e., one of the data structures discussed herein) may be associated with a time or indication of a point in operation of the vehicle at which the determination with which the entry is associated was made.

The techniques discussed herein may improve the safety of an autonomous vehicle by detecting errors in software and/or hardware systems of the vehicle, validating fixes to software and/or hardware, ensuring that systems of the autonomous vehicle have been used extensively before being relied upon, and increasing the amount of data available to a planning component for making decisions, among other benefits. Any or all of these improvements may improve the safety and efficacy of operation of an autonomous vehicle. The decision registry and use thereof may improve the efficacy of the autonomous vehicle by reducing wasteful repetitive computations, such as "flickers" where the output of a component toggles between two or more outputs; decrease the number of times the autonomous vehicle needs to transmit a request for assistance to a teleoperations system and increase the confidence that such a request is necessary; and/or the like. Moreover, the decision registry may be used to train, re-train, debug, or the like various components of the autonomous vehicle, which may improve the vehicle's navigation of various scenarios.

The decision registry may also improve the efficiency of storage of vehicle data since the decision registry may create new associations with log data. For example, the decision registry may enable automated deletion of log data based at least in part on the data structure. In some examples, the data structure may be used to identify log data that isn't associated with any events of interest and such data may be deleted. In yet another example, the decision registry may be used to disseminate log data to different storage locations and/or to different computing devices for handling different types of events. These increase the efficiencies of a computing device by reducing storage consumption and load balancing storage in such a way that log data is stored where it will be most likely to be used, which may reduce computational processing load and time by reducing searching and/or retrieval time.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle. For example, data structures entered into the decision registry may be generated for real-world and/or simulated operations of the vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic, and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

The autonomous vehicle 102 may provide the sensor data received from such sensor(s) 104 to one or more systems of the autonomous vehicle 102 to accomplish a variety of functions of the autonomous vehicle. For example, one or more systems may control a passenger ride experience (e.g., temperature/humidity control, interior display control, door control functionality, seat functionality), a localization and/or mapping system may generate a map of surroundings of the autonomous vehicle and/or a position and/or orientation of the autonomous vehicle 102 within a map, perception system that may detect and track object(s) in an environment of the autonomous vehicle, a prediction system that may predict future positions, velocities, and/or accelerations of objects in the environment, a planning system that may determine a trajectory for controlling motion of the autonomous vehicle, etc. These systems may, in turn, include one or more components.

In at least one example, computing device(s) 106 may comprise a memory 108 storing a perception component 110, a planning component 112, decision registry 114, and/or controller(s) 116. The perception component 110, the planning component 112, the decision registry 114, and/or the controller(s) 116 may include one or more machine-learned (ML) models and/or other computer-executable instructions. In general, the perception component 110 may determine what is in the environment surrounding the vehicle 102 and the planning component 112 may determine how to operate the vehicle 102 according to information received from the perception component 110. For example, multiple sub-components of the perception component 110 and/or planning component 112 may be used to determine trajectory 118 based at least in part on the perception data and/or other information such as, for example, one or more maps, localization information (e.g., where the vehicle 102 is in the environment relative to a map and/or features detected by the perception component 110), and/or a path generated by a high level mission planner of the planning component 112.

In some examples, the perception component 110 may receive sensor data from the sensor(s) 104 and determine data related to objects in the vicinity of the vehicle 102, such as the static and/or dynamic data. For example, such a detection may be conducted by one or more object detection component(s) 120, which may comprise one or more ML model(s) and/or ML or other processing software and/or hardware pipeline(s). In the depicted example, the sensor data comprises an image 122 and an object detection generated by one or more object detection sub-components (120) of the perception component 110 may comprise a bounding box 124 indicating the existence of an object represented in the image 122 and a semantic label 126 indicating an object type associated with the object, i.e., a "passenger vehicle" in this instance. The perception component 110 may additionally or alternatively determine route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 110 may receive as input. The perception component 110 may be configured to detect as many objects and information about the environment as possible to avoid failing to account for an event or object behavior that should be taken into account by the planning component 112 in determining the trajectory 118.

The object classifications generated by sub-component(s) of the perception component may distinguish between different object types such as, for example, a passenger vehicle, a pedestrian, a bicyclist, a delivery truck, a semi-truck, traffic signage, and/or the like. The perception component 110 may additionally or alternatively determine a track associated with an object, wherein the track may comprise a historical, current, and/or predicted object position, velocity, acceleration, and/or heading. The data produced by the perception component 110 may be collectively referred to as perception data. Once/as the perception component 110 generates perception data, the perception component 110 may provide the perception data to the planning component 112. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110 to determine one or more trajectories, control motion of the vehicle 102 to traverse a path or route, and/or otherwise control operation of the vehicle 102, such as controlling passenger-facing features of the vehicle such as exterior doors, HVAC system(s), and/or the like, though any such operation may be performed in various other components (e.g., localization may be performed by a localization component, which may be based at least in part on perception data). For example, the planning component 112 may determine a route for the vehicle 102 from a first location to a second location; determine a smooth trajectory from a coarse trajectory received from the guidance system; generate, substantially simultaneously and based at least in part on the path and perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to the controller(s) 116 for actuating drive components of the vehicle 102. FIG. 1 depicts an example of such a trajectory 118, represented as an arrow indicating a heading, velocity, and/or acceleration, although the trajectory itself may comprise instructions for controller(s), which may, in turn, actuate a drive system of the vehicle 102.

The trajectory 118 may comprise instructions for controller(s) 116 of the autonomous vehicle 102 to actuate drive components of the vehicle 102 to effectuate a steering angle and/or steering rate, which may result in a vehicle position, vehicle velocity, and/or vehicle acceleration that tracks the path generated by the guidance system. For example, the trajectory 118 may comprise a target heading, target steering angle, target steering rate, target position, target velocity, and/or target acceleration for the controller(s) to track as part of the path. In some examples, the controller(s) may comprise software and/or hardware for actuating drive components of the vehicle 102 sufficient to track the trajectory 118.

In some examples, the decision registry 114 may create a data structure associated with an output of interest by any of the components or sub-components of the autonomous vehicle, whether they are illustrated in FIG. 1 or not. The perception component 110 and planning component 112 are discussed in more depth here so as to provide examples of the kinds outputs that may be tracked by the decision registry 114 and how the decision registry may be used to create traces, determine software and/or hardware usage/coverage, determine complexity of scenes, identify unwanted output flicker, determine whether an attempted fix of an error was successful, provide additional granularity for training ML models and/or for replaying log data and/or determining log data that was associated with a particular component state, and/or automatically detect and/or classify an error.

In the illustrated example, various components and/or sub-component(s) (128) of the perception component 110 and/or planning component 112 may generate various outputs, i.e., output 130 generated by object detection sub-component 120, output 132 generated by a relative distance component 134, output 136 generated by a double-parked vehicle exception component 138, output 140 generated by a minimum distance rule component 142, and the trajectory 118 generated by a trajectory generation component 144. For example, an object detection comprising the bounding box 124 and/or the semantic label 126 may be output as output 130 to the relative distance component 134 and/or the double-parked vehicle exception component 138. The relative distance component 134 may receive one or more object detections associated with one or more sensor types and may determine the minimum distance between the vehicle 102 and the nearest object and/or the nearest object in a corridor associated with a current trajectory being executed by the vehicle 102. This relative distance may be output by the relative distance component 134 as an output 132 to at least double-parked vehicle exception component 138 and/or others, such as the trajectory generation component 144.

Another component, the minimum distance rule component 142 may determine a threshold distance based at least in part on various sensor data, perception data, the object detection, and/or a scene complexity indication generated based at least in part on the decision registry. For example, the scene complexity may comprise a value that indicates how much objects and/or environmental conditions cause extra (e.g., exceeding a long-term average or an average for that time of day, location, etc.) computation by various components of the autonomous vehicle. The scene complexity may additionally or alternatively indicate complexity as a function of the unpredictability of the scene, as measured by how frequently outputs of various components toggle and/or an amount of hardware and/or software that is being used contemporaneously or within a threshold amount of time (i.e., an amount of coverage at a particular point in time or over a time window). The greater the amount of coverage within a time window, the greater the scene complexity and the higher the value indicated by the scene complexity. Output from an ML model trained to determine scene complexity may additionally or alternately be used as part of the scene complexity score. For example, see U.S. patent application Ser. No. 16/457,643, titled "SYSTEM AND METHOD FOR DETERMINING TARGET VEHICLE SPEED," the entirety of which is incorporated herein for all purposes.

The threshold distance determined by the minimum distance rule component 142 may indicate a minimum distance the autonomous vehicle should maintain from other objects in the environment. This threshold distance may be output as output 140 to the double-parked vehicle exception component 138 and/or the trajectory generation component 144 in at least one example.

The double-parked vehicle exception component 138 may determine may whether to generate an indication that an exception may be made that would allow the trajectory generation component 144 to generate a trajectory into a lane associated with oncoming traffic. The double-parked vehicle exception component 138 may use the object detection received as output 130 to determine whether a double-parked vehicle exists in the first place (e.g., the object detection may include an indication of whether or not an object is in a "double-parked" state, where the object is blocking the lane and appears to be stopped with no intention of moving within a threshold amount of time). If no such indication is received that such an object exists, the double-parked vehicle exception component 138 may output an indication that no exception should be made, as output 136. In another example, if such an object exists, the double-parked vehicle exception component 138 may determine whether the relative distance (output 132) is within a threshold distance or time of the minimum distance (output 140) or if the relative distance is equal to or less than the minimum distance. In such an instance the double-parked vehicle exception component 138 may output an indication to make an exception, as output 136.

The trajectory generation component 144 may generate one or more candidate trajectories based at least in part on whether an exception can be made, according to output 136; a minimum distance to maintain from other objects, according to output 140, and/or other inputs, such as sensor data, object detection(s), and/or the like. In some examples, the trajectory generation component 144 or another component of the planning component 112 may select one of these components based at least in part on a complex set of rules and/or an ML pipeline for scoring the candidate trajectory(ies). Regardless, trajectory 118 may ultimately be output and implemented by the autonomous vehicle 102, such as by controller 116.

In the limited example discussed herein, the decision registry 114 may generate (e.g., create, populate) a first data structure in association with output 130, a second data structure in association with output 132, a third data structure in association with output 136, a fourth data structure in association with output 140, and/or a fifth data structure in association with trajectory 118. These data structures may be stored as entries in the decision registry 114 and may be the same or different from each other. To give a limited example, the data structure generated in association with trajectory 118 may identify a time that the trajectory 118 was output, components upon which the trajectory 118 is based, either directly (e.g., double-parked vehicle exception component 138, minimum distance rule component 142 in the depicted example) and/or remotely (e.g., relative distance component 134, object detection component 120, sensor(s) 104); factors that influenced the determination directly (e.g., output 136 indicated that an exception was permitted by the double-parked vehicle exception component 138 and the trajectory 118 is associated with an oncoming lane); a result of the determination (e.g., a coarse indication, such as "successful merge," or a fine indication, such as autonomous vehicle 102 successfully merged into the oncoming lane and re-merged into the original lane); the name of the component that generated the output; the name of and/or values associated with the output; etc.

To give another example, the data structure associated with output 136 may indicate a name of the component, a name of the output, a value of the output, a source of the determination (e.g., an object was detect in the lane that the autonomous vehicle 102 is operating in), factor(s) upon which the determination was based (e.g., the relative distance (output 132), the threshold distance (output 140), a reason, such as "value met or exceeded"), component(s) associated with the factors, an outcome, and/or the like. In some examples, the factor(s) may identify a value that led to the determination (e.g., the relative distance from the vehicle to the object), a limit that led to the determination (e.g., the threshold upon which the determination was based at least in part), and a reason indicating the interaction between the value and the limit (e.g., the value exceeded the limit, the value equaled the limit, the value was less than the limit). The reasons discussed above deal primarily with values received from other components or determined by the component and comparison thereof to a threshold, but the reason may be different based on the type of component(s) and outputs involved.

Further examples are discussed herein, including techniques for using the decision registry for trace generation, error detection and/or classification, etc.

Example System

Figure 2:
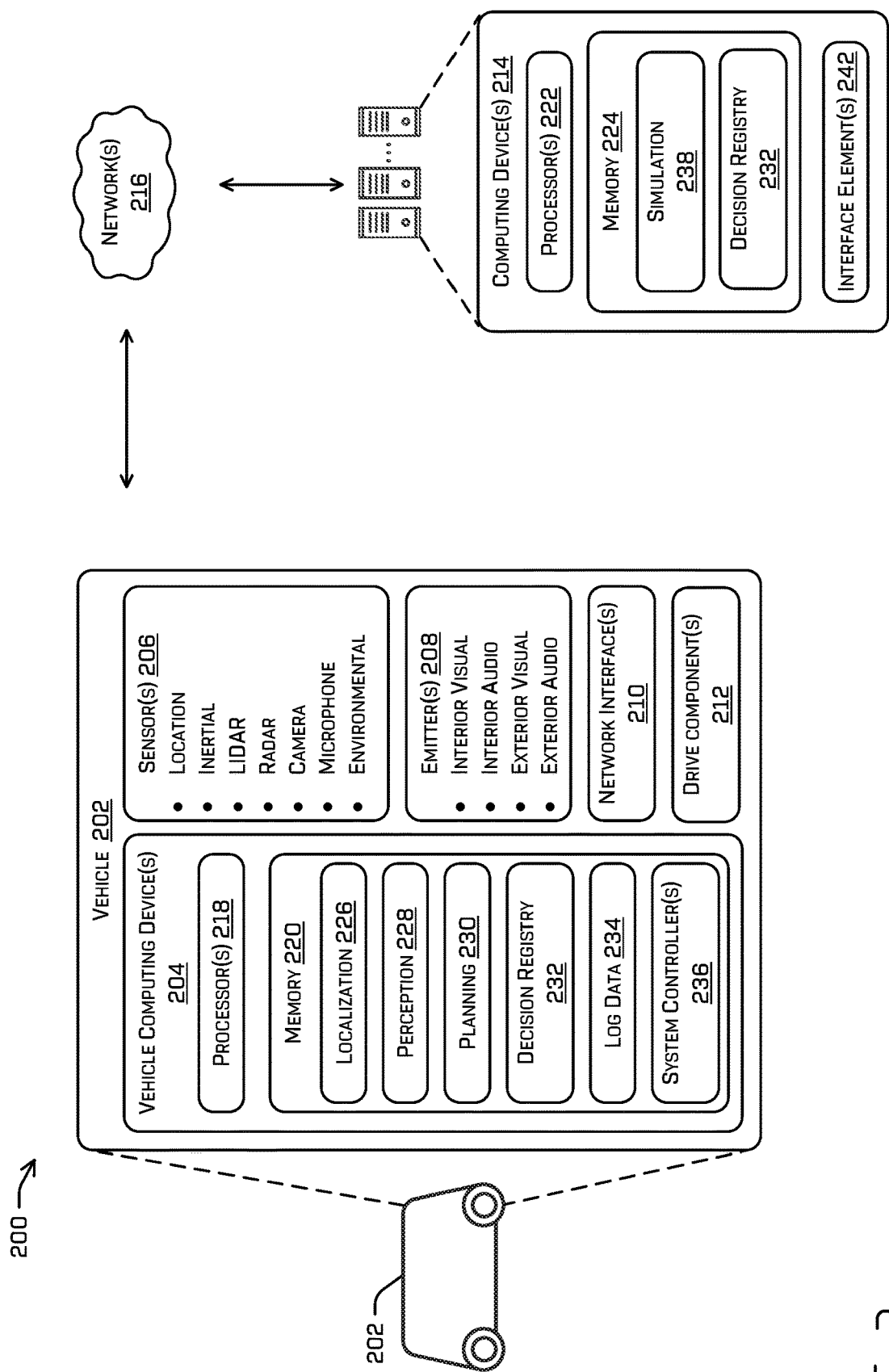
FIG. 2 illustrates a block diagram of an example autonomous vehicle architecture comprising a decision registry for tracing factors upon which determinations are based, reproducing vehicle behavior, detecting errors and/or error types, detecting failed component fixes, etc.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, decision registry 232 (which may be software and/or hardware, e.g., a portion may be hardware, such as GPU(s), CPU(s), FPGA(s), ASIC(s), and/or other processing units), log data 234, and/or system controller(s) 236. Perception component 228 may represent perception component 110, planning component 230 may represent planning component 112, decision registry 232 may represent decision registry 114, and system controller(s) 236 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The decision registry 232 may operate on the vehicle 202 and/or on the computing device(s) 214. In some examples, the decision registry 232 may be downstream (receive input) from at least some components of the perception component and/or the planning component 230. Although, in at least some examples, the position of the decision registry 232 in the pipeline may be irrelevant. In some examples, the decision registry 232 may comprise a portion of storage in memory 220 and/or memory 224, application programming interface(s) (API(s)), hook(s), a subscribing component in a publish-subscribe network, a sub-component of a component, and/or any other component sufficient for identifying actions of interest by a component of the vehicle 202.

For example, the decision registry 232 may generate a data structure in association with all or particular determinations of the double-parked vehicle exception component 138 of the planning component 112. To do so, the decision registry 232 may comprise a hook or a sub-component within the decision registry 232 to monitor actions of the double-parked vehicle exception component 138 and generate and/or transmit data to the decision registry 232 so that the decision registry 232 may generate and store the data structure. In an additional or alternate example, the double-parked vehicle exception component 138 may call an API of the decision registry 232 when the double-parked vehicle exception component 138 commits an action of interest. In yet another additional or alternate example, the decision registry 232 may receive output(s) of the double-parked vehicle exception component 138 via a publish-subscribe network, such as where the double-parked vehicle exception component 138 comprises a publisher and the decision registry 232 comprises a subscriber on the publish-subscribe network.

Regardless, the decision registry 232 may receive data necessary for generating the data structure associated with a determination, which may comprise receiving the data from the monitored component itself, a sub-component thereof, a hook or similar monitor, and/or a combination thereof. Once the decision registry 232 receives such data, the decision registry 232 may generate and store the data structure discussed herein. The stored portion of the decision registry 232 may be transmitted as part of or in association with log data 234.

In some examples, the log data 234 may comprise sensor data, perception data, planning data, and/or any other raw data or determination of any component or sub-component of the autonomous vehicle. In some examples, an entry in the decision registry 232 may comprise an identifier of a portion of the log data with which the entry is associated. For example, the log data may comprise a determination to control the autonomous vehicle according to a trajectory at a first time. The decision registry 232 may have generated and stored a data structure in association with such a determination and the data structure may identify the determination, the trajectory, and/or the sensor data associated with the first time and/or the first time itself.

In some examples, the log data 234 may be transmitted to the computing device(s) 214 for storage. In at least one example, the log data 234 may be stored on a temporary basis at the vehicle 202, streamed or otherwise transmitted to the computing device(s) 214 for more permanent storage, and deleted from or deprioritized in storage on the vehicle 202 once a confirmation of storage at the computing device(s) 214 has been received. In some examples, decision registry entry(ies) may also be transmitted to the computing device(s) 214 for storage. In at least one example, decision registry entry(ies) may be associated with the log data 234 and may be transmitted contemporaneously or sequentially to the computing device(s) 214. The decision registry 232 may form an interconnection/association between portions of log data 234 and/or hardware and/or software components of the vehicle.

Memory 224 may additionally or alternatively include a simulation component 238 and/or the decision registry 232. In some examples, the simulation component 238 may receive scenario data, which may comprise sensor data, scenario instructions, and/or a scenario data structure. In some examples, the scenario data structure may comprise a position, orientation, and/or characteristics of static object(s), dynamic object(s), and/or the simulated vehicle in the environment, which may correspond to real-time operation of an autonomous vehicle and/or may correspond to simulated operation of the autonomous vehicle. In some examples, a planning component 230 of the autonomous vehicle may generate instructions for controlling the simulated vehicle in an agnostic manner to the simulation (e.g., the instructions generated by the planning component may be the same as those generated for a similar real-world situation). The operation of the planning component may be tested in this manner. In some examples, a component may translate instructions generated by the planning component to instructions for controlling the simulated vehicle in the simulated environment (e.g., updating a simulated state associated with the simulated vehicle, which may comprise a position, orientation, velocity, acceleration, heading, and/or the like associated with the simulated vehicle).

The scenario data may additionally or alternatively comprise an indication of an object type associated with one or more objects and/or characteristics associated with the one or more objects (e.g., a position, velocity, acceleration, heading, material type, kinematic coefficient). Any of the data discussed herein may be part of the scenario data structure associated with a portion of log data. The scenario data structure may comprise a two-dimensional image, a publish-subscribe message, and/or the like. In some examples, an entry in the decision registry 232 or log data identified thereby may be used to generate the scenario data structure.

In some examples, the simulation component 238 may instantiate, based at least in part on the scenario data, a simulated environment, according to any of the techniques discussed herein. For example, the simulation component 238 may procedurally generate a simulated environment based at least in part on a set of template models associated with the object types and/or sensor data and/or perception data indicated in the log data 234. For example, the set of template models may comprise three different passenger vehicle models, four different pedestrian models, and/or the like. Any number of different models may exist. In some examples, a template model may comprise a three-dimensional model of a surface of an object without any texturing, although in additional or alternate examples, the model may comprise texture.

The template model may comprise a polygon mesh, a triangle mesh, and/or the like. In some examples, models associated with dynamic objects may have a higher polygon count than models associated with static objects. In some examples, the simulated environment may comprise surface models and lack lighting and/or textures. In additional or alternate examples, the simulated environment may comprise lighting and/or textures, but the techniques described herein work without lighting and/or textures. The simulated environment may comprise a model of the simulated vehicle. In some examples, instantiating the environment portion of the simulated environment may be based at least in part on log data, scenario data, and/or map data and objects in the environment may be based at least in part on instructions received as part of the scenario data (e.g., instructions generated based at least in part on user selection(s) and/or interaction with a user interface, procedurally-generated instructions).

As described herein, the localization component 226, the perception component 228, the planning component 230, the decision registry 232, simulation component 238, and/or other components of the system 200 may comprise one or more ML models. For example, the localization component 226, the perception component 228, the planning component 230, and/or the decision registry 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as a Pixor model, in some examples.

In some examples, an ML model may comprise a neural network such as, for example, a convolutional neural network (CNN). As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure. In some examples, the decision registry 232 discussed herein and/or an ML model may comprise processor-executable instructions stored in a memory of the computing device(s) 204 and/or accessible thereto, hardware, and/or some combination thereof (e.g., a field-programmable gate array (FPGA), application-specific integrated circuit (ASIC)).

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228, and may validate the perception data and/or path generated by a trajectory generation component, and/or transmit instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Process for Generating Decision Registry Entry(ies)

Figure 3:
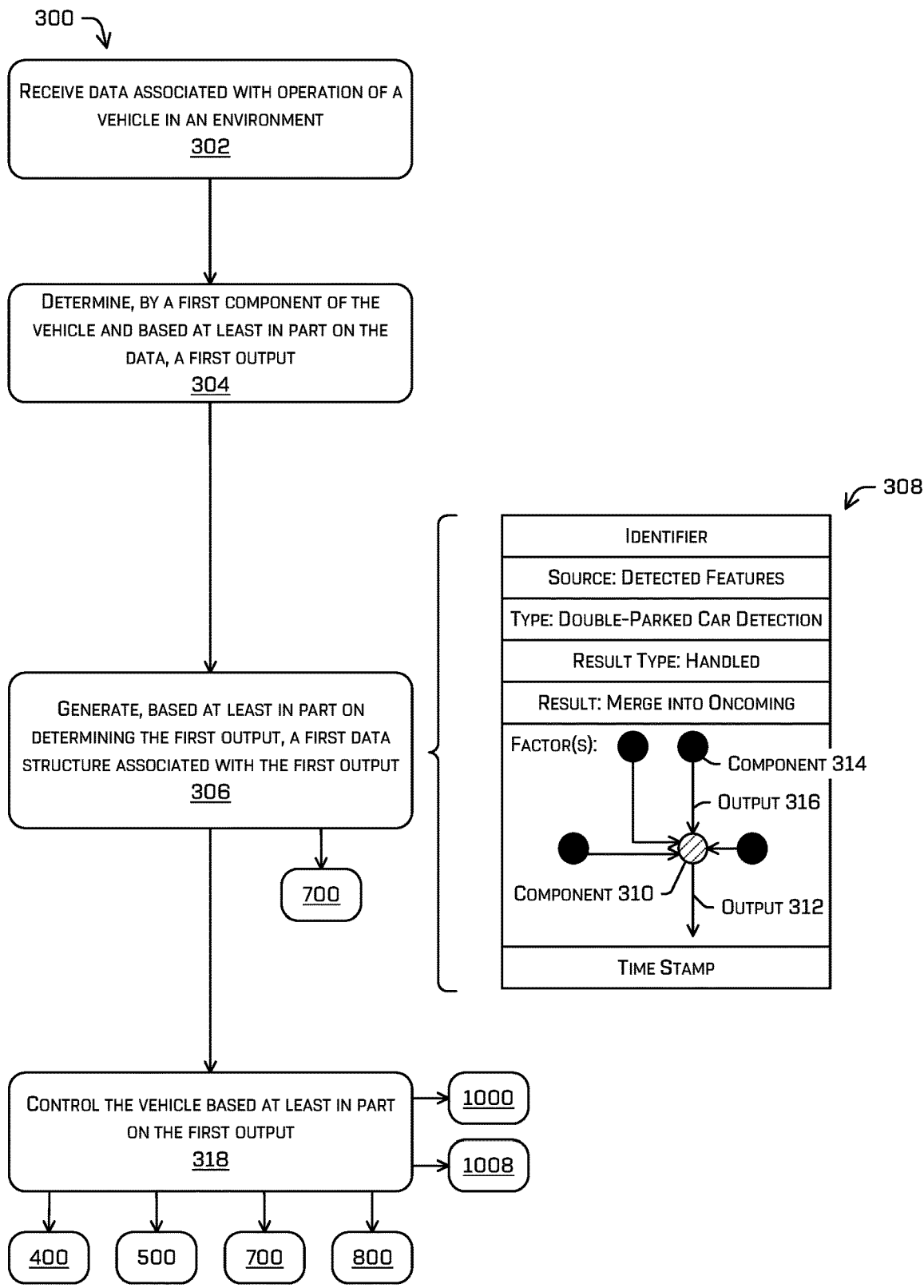
FIG. 3 illustrates a flow diagram of an example process executed at an autonomous vehicle for tracking, in a decision registry, determinations made by various components of a vehicle. An entry in the decision registry may be a data structure of the type described herein.

FIG. 3 illustrates a pictorial flow diagram of an example process 300 executed at an autonomous vehicle and/or a simulation component for tracking, in a decision registry, determinations made by various components of a vehicle.

At operation 302, example process 300 may comprise receiving data associated with operation of a vehicle in an environment. For example, operation 302 may comprise receiving sensor data, perception data, planning data, and/or any other data generated by or in associated with the vehicle, such as log data.

At operation 304, example process 300 may comprise determining, by a first component of the vehicle and based at least in part on the data, a first output. Such an output may be identified as an action of interest by the decision registry and the first component that generated the determination may be a component of interest. The decision registry may monitor component(s) of interest to detect when a component commits to an action of interest (e.g., via a hook, API, publish-subscribe message, direct transmission, or any of the other messages discussed above), such as operation 304. In some examples, a rule set may identify an action of interest and/or a component of interest to track-in other words, the decision registry may track actions of a particular type across one or more components, actions of a particular type committed by a particular component, and/or all actions of a particular component. In some examples, a user interface may allow a user to modify the rule set and identify the action(s) and/or component(s) for tracking.

A component of interest, such as the first component, may comprise any component or sub-component of the autonomous vehicle that is being tracked by the decision registry. Common components of interest may include but not be limited to high-level determinations of the planning component, lower-level determinations of sub-components of the planning component, high-level outputs of the perception component, and/or lower-level determinations of sub-components of the perception component. It is understood, however, that the techniques may be extended to any other component, including planning component(s) for passenger experience, such as component(s) that control lighting, HVAC, passenger entry(ies) and/or windows, and/or the like; and/or exterior vehicle functions such as, vehicle lighting, vehicle speakers, vehicle passenger interfaces, and/or the like; etc.

To give a more concrete example, without limitation, an action of interest may include a determination: to follow an object, of a speed at which to operation the vehicle, to stop, to yield, to conduct an all-way stop protocol, to modify an operating parameter of a sensor (e.g., changing the way the sensor operates), to cross a double-yellow line or otherwise enter a lane associated with oncoming traffic (e.g., due to construction, a double-parked vehicle, etc.), to change lanes, to merge, to yield to a crosswalk, to yield to a pedestrian or animal, to stop at a mission endpoint, to react to a cut-in or an agent that is acting out-of-turn, to identify a traffic light as being in a particular state, to control the autonomous vehicle according to a custom trajectory, to open or close a passenger door or window, etc. The list is certainly not exhaustive and could include lower-level outputs and/or states, such as the estimated distance to an object, whether or not an exception can be made, various thresholds set by a component and determined based at least in part on sensor and/or perception data, etc.

At operation 306, example process 300 may comprise generating, based at least in part on determining the first output, a first data structure associated with the first output. FIG. 3 depicts an example portion of such a data structure, example data structure 308. In some examples, the data structure may comprise any of the following, depending on the type of determination and/or the component:

An identifier that may indicate a determination type, one or more vehicles or objects that the determination corresponds to, component(s) that generated the determination, location(s) or other indication(s) of the vehicle or object's progress, and/or a value (e.g., a hash or sequential value);

A source type that indicates the coarse-grained source of the reason for the determination (e.g., a software or hardware component or system, such as a double-parked exception might be triggered because of a double-parked vehicle detection, which is a feature detection received from the planning component);

A source that indicates a fine-grained source for the determination (e.g., a software or hardware function or subsystem, such as double-parked vehicle detected, four-way stop detected, yellow light detected, another vehicle moved out-of-turn or cut-in);

A result type that indicates a coarse-grained result of the determination (e.g., handled, partially handled, passed, teleoperations called);

A result that indicates a fine-grained result of the determination (e.g., yield, merge, continue, emergency maneuver);

One or more factors that resulted in the determination, whether upstream or downstream factors;

Auxiliary data that may indicate any additional data; and

A time (e.g., a time at which the determination was made and/or a future time if the determination is associated with a prediction, for example).

In some examples, the data structure may identify one or more factors associated with a single determination. A factor may comprise an additional data structure, which may comprise a name of the factor (e.g., in common parlance: distance from double-parked vehicle too great, estimated velocity untrustworthy, confidence that pedestrian is gone and not hidden too low), a value that led to the determination, a limit associated with the decision, a reason (e.g., how the limit and the value interact), and/or any additional information. For example, the example in FIG. 1 is structured to give an easy example of two such factors-double-parked vehicle exception due to a distance threshold being met and double-parked vehicle no exception due to a distance threshold not being met. For example, a factor named "double-parked vehicle exception due to a distance threshold being met," in common parlance, may identify the name, the value may be the estimated distance to the double-parked vehicle detection, the limit may be the threshold distance generated by the minimum distance rule component, and the reason may be that the estimated distance is less than or equal to the minimum distance or within a threshold of the minimum distance.

In some examples, the factor(s) may identify the output(s) and/or state(s) upon which the first output was based and/or the component(s) that output such output(s) and/or state(s). For example, FIG. 3 illustrates the first component 310 as a circle with hashes and the first output as output 312 and the components upon which the first component 310 determined the output 310 as filled-in circles, such as component 314, which determined output 316. The decision registry identifies component 310 as having relied on the output 316 to determine output 312.

At operation 318, example process 300 may comprise controlling the vehicle based at least in part on the first output.

In some examples, example process 300 may transition to one or more of process 400 (e.g., using the decision registry to generate a trace and/or detect a flicker), 500 (e.g., using the decision registry to generate a representation of vehicle operation associated with a particular action of interest and/or component of interest), 700 (e.g., using the decision registry to determine whether an activated component has been sufficiently tested), 800 (e.g., using the decision registry to determine a complexity of a scenario), 1000 (e.g., training an ML model to detect an error and/or classify an error type), and/or 1008 (e.g., classify an error type using the ML model).

Figure 4A:
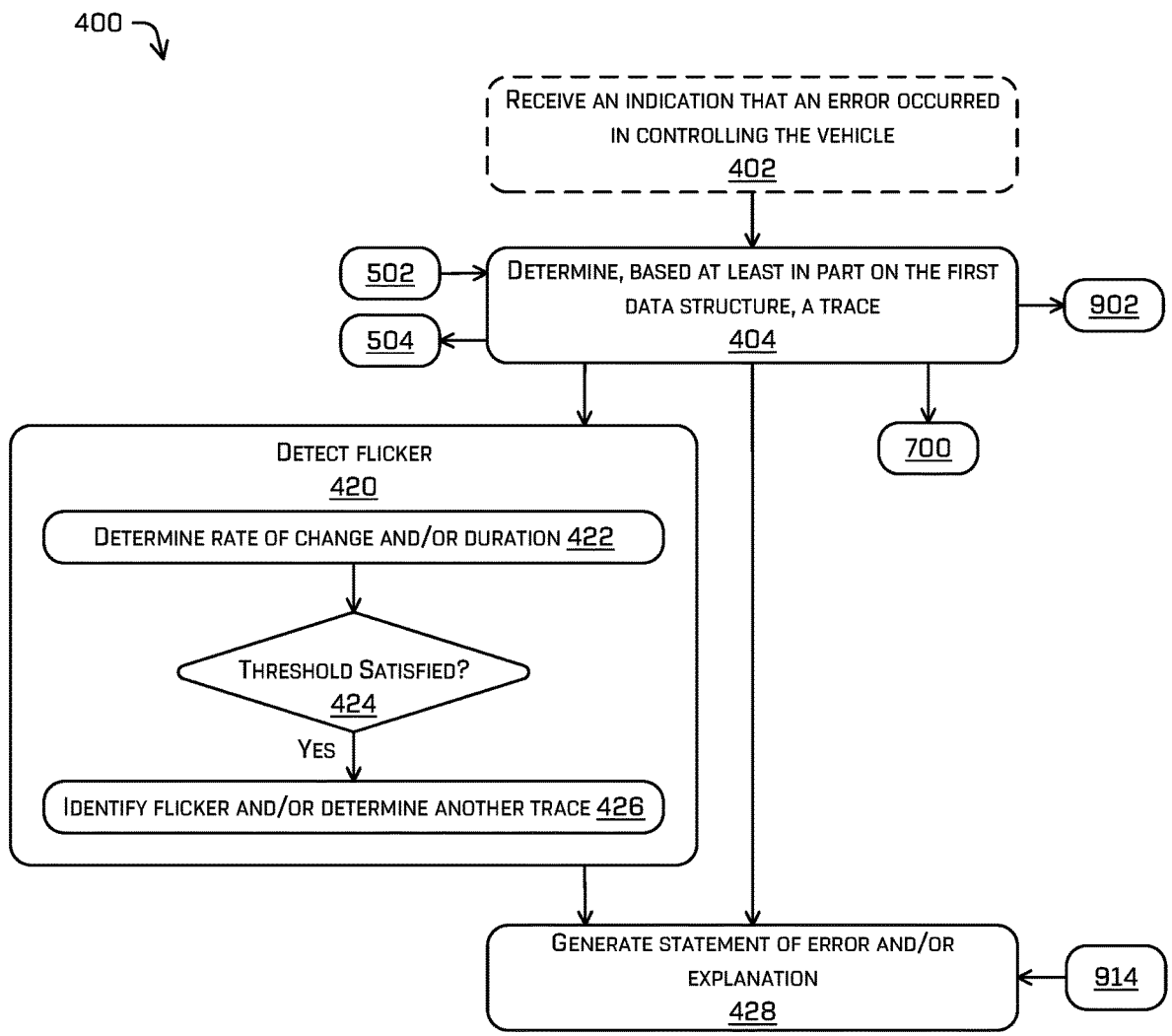
FIG. 4A illustrates a flow diagram of an example process for using the decision registry to trace factors that contributed to an outcome, detect output flicker by a component, and/or other examples.

Example Process for Determining a Trace, Detecting a Flicker Using the Decision Registry, and/or Generating an Error or Explanation Statement FIG. 4A illustrates a flow diagram of an example process 400 for using the decision registry to trace factors that contributed to an outcome, detect output flicker by a component, and/or other examples. Example process 400 may occur on-vehicle or at another computing device, such as at a remote computing device such as a distributed computing service for training an ML model, a teleoperations computing device for servicing a teleoperations request generated by the vehicle, a computing device used by a vehicle engineer to debug and/or monitor operations of the vehicle, and/or the like. In at least one example, example process 400 may be a stand-alone process conducted based at least in part on receiving one or more entries of a decision registry or, in another example, example process 400 may be used as part of one or more other processes.

At operation 402, example process 400 may comprise receiving an indication that an error occurred in controlling the vehicle. In some examples, example process 400 may not include operation 402, such as where the vehicle has not detected that an error has occurred, where the trace is determined to detect an error, or in an instance where the trace is being used for other purposes. In at least one example, the indication of the error may be based at least in part on user input at a user interface, detecting a flicker, and/or based at least in part on a self-monitoring component of the vehicle, such as a trajectory-checking component that determines that a trajectory is unsuitable for a scenario and/or associated with a confidence score that fails to meet or exceed a threshold.

At operation 404, example process 400 may comprise determining, based at least in part on the first data structure, a trace. Operation 404 may comprise using one or more factors identified by the first data structure to reconstruct a set of reason(s), output(s), and/or component(s) upon which the first output was based, wherein the first data structure was generated based at least in part on the first output. In at least one example, operation 404 may use the factor(s) to identify the output(s) and/or component(s) upon which an output was based, at least in part, up to a depth that may be specified by the process that triggered the trace or regardless of depth. For example, the depth may specify a depth of one, which may indicate components that generated outputs received directly by the component of interest; a depth of two may indicate the previously-mentioned components along with any components whose outputs were provided as inputs to those components; and so on. In some examples, the depth may be unspecified and the trace may be determined up to any depth.

Figure 4B:
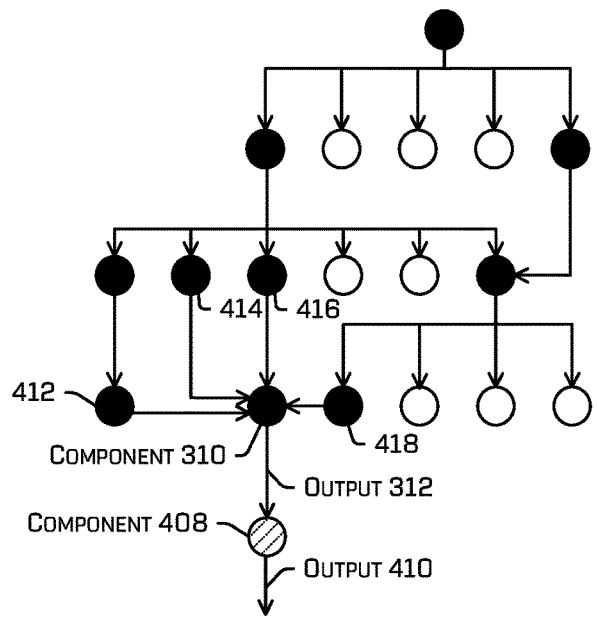
FIG. 4B illustrates a block diagram of an example trace through a representation of components and their respective outputs.

Turning to FIG. 4B to further illustrate, FIG. 4B illustrates a block diagram of an example trace through a representation of components and their respective outputs, e.g., at a particular time step. The component of interest is illustrated as a hashed circle, component 408. The output 410 determined by component 408 is determined based at least in part on output 312. This dependency may be indicated by a data structure (a factor of the data structure) generated in association with output 410. A trace generated based at least in part on an unspecified or unlimited depth specified may identify any of the components that are shaded in, as any of the outputs thereof may have had at least a remote influence on output 410. A trace with a depth of one would only identify component 310; a trace with a depth of two would identify component 310, 412, 414, 416, and 418; and so on. In an additional or alternate example, the default (unspecified) depth may be limited instead of unlimited, such as a depth of two, one, or any other number.

The trace may comprise a data structure identifying the component(s) and/or output(s) thereof, which may include identifying a portion of log data, time, or the like to sufficiently identify the data associated therewith. For example, the trace may comprise a directed graph, directed acyclic graph (DAG), a weighted graph (e.g., where the weights indicate a frequency with which a factor is identified by data structures generated in association with a component and/or a specific type of output), etc. A trace may be associated with a time and/or particular time step (e.g., instance or "tick" of a processing component execution) and a trace may be determined for different time steps of a component's output, resulting in a set of traces associated with a component's outputs over a time range. In examples where the trace is a graph, the time data may be associated with vertices of the graph.

Although the depiction of the trace in FIG. 4B illustrates an upstream trace that identifies outputs that influenced the output of the component of interest, operation 404 may additionally or alternatively determine a downstream trace that identifies component(s), the outputs of which were based at least in part on the output of the component of interest.

In some examples, operation 404 may be based at least in part on operation 502 and/or example process 400 may transition to operation 504, 700, and/or 1002 in addition to or instead of transitioning to operation 420 and/or 422.

At operation 420, example process 400 may comprise detecting a flicker associated with a component. Detecting the flicker may be based at least in part on the trace or two or more traces and may comprise operation(s) 422, 424, and/or 426. In some examples, operation 420 may be used to determine whether an attempted fix worked or that a new component is functioning correctly—either instance may be used to trigger operation 420 and/or operation 404. When a flicker exists, a component's output may rapidly toggle, change between multiple outputs, or fleetingly output a bad output (e.g., an unusable signal, a true error, an incorrect output due to a hardware or software error). Such changes may be fleeting or form a duty cycle that is very difficult to detect or obscures the issue since higher-level actions of the vehicle may not manifest the issue.

For example, if a flicker occurs in a double-parked vehicle exception component 138, the component 138 may transiently output an exception or toggle between outputting an exception and not. A transient output may be difficult or impossible to detect without the techniques discussed herein and the toggle of an output of such a component may form a duty cycle (but one that might seriously impede the vehicle's efficacy and/or progress) and may more visibly affect the operation of the autonomous vehicle in some cases. Even if a transient output is detected and in the case of toggling, a developer or vehicle engineer may have to rule out other causes through experimentation to identify the problem.

At operation 422, detecting the flicker may comprise determining a rate of change and/or a duration of a state, action, value, and/or other representation indicated by an output of a component and determining whether the rate of change meets or exceeds a threshold. In some examples, operation 422 may be conducted for any component identified in a trace and/or a previously detected flicker may be the error received at operation 402, in some examples. Operation 422 may include determining an average rate of change, a windowed average, or the like in addition to or instead of a rate of change over a specified time period.

At operation 424, detecting the flicker may comprise determining whether the rate of change and/or the duration satisfy a threshold. Determining that the rate of change satisfies a threshold may include determining that the rate of change meets or exceeds a threshold rate of change, whereas determining that the duration satisfies a threshold may include determining that the duration does not meet a threshold duration. In some examples, rate of change or duration may be used or they may be used together. Regardless, if neither satisfy a threshold, operation 422 may be repeated for another component identified by the trace or operation 420 may be terminated if no other component remains. If a threshold of at least one of the rate of change or duration is satisfied, operation 420 may continue to operation 426.

At operation 426, detecting the flicker may comprise identifying the output and/or the component as being associated with a flicker. In some examples, operation 426 may additionally or alternatively comprise determining one or more additional traces based at least in part on the component and/or the output causing the flicker. For example, the component might not be the original component that was the basis of the trace (i.e., the "0" depth component) and/or the depth for the trace may have been shallow (e.g., just one component or just two components in depth). The additional trace(s) may be used to identify further components for testing for a flicker via operation 420. In some examples, testing for additional flickers may confirm that the component that was identified at operation 426 was indeed the cause of a flicker or the testing may reveal that there was an underlying flicker from another component resulting in the apparent flicker cause by the component identified at operation 426.

In some examples, the factor(s) identified by a data structure may enable example process 400 to identify a portion of code or a portion of hardware that causes an error. For example, a factor may identify a component that was relied upon to make a determination. This identification may comprise an identification of a portion of code, a portion of hardware, or the like that is associated with the output identified by the factor. Therefore, when a flicker from a component is detected or another error is detected example process 400 may comprise identifying the portion of code or a portion of hardware associated with an error.

At operation 428, example process 400 may comprise generating a statement of the error and/or an explanation based at least in part on the trace and/or the detected flicker. In some examples, the statement may be a statement in common vernacular—plain language instead of machine language. The generated statement may be a statement of error if a component was identified according to operation 420 and/or operation 914, but if no such identification was made the statement may provide a plain language statement for why a particular component made the determination it did. In either instance, the identified component and a trace generated in association with the identified component may be used to generate the statement of error.

For example, factor(s) from a data structure associated with the identified component and the value(s), limit(s), and/or interaction(s) identified thereby may be used to create the statement. In some examples, an ML model, such as a natural language processing component, may be used to generate the statement based at least in part on the value(s), limit(s), and/or interaction(s) identified by the factor(s) of a data structure, and/or the output type may be associated with a template statement that may be used to generate the statement. In yet another example, multiple factors from different data structures associated with different components of a trace may be used to generate the statement. In some examples, the component may be identified by a user and the statement may be generated responsive to user selection of an output by the component.

To give a non-limiting example, the autonomous vehicle may have exhibited some odd behavior—the engine winds up briefly on occasion but there's no consistent pattern as to why this is occurring or the brakes are subtly tapped briefly on occasion for no apparent reason. A user may select the trajectory generation component output that caused the transient unwanted operation (e.g., via a user interface, as discussed in further detail below) and example process 400 may determine a trace and identify that a component two components deep from the trajectory generation component is flickering. Note that "two components deep" may mean that the identified (flickering) component may produce an output received by a component that produces an output received by the trajectory generation component. Example process 400 may generate a statement identifying the flicker of the identified component as resulting in the transient trajectory generation output.

In another non-limiting example, a user may want to know why the autonomous vehicle chose to change lanes when it didn't appear that it was necessary to change lanes. Nothing in any of the components seems to be operating incorrectly. The user may select the lane change operation and the example process 400 may generate a trace starting at the trajectory generation component. The trace (or one or more traces over time) may reveal that a state output by a component changed, such as a confidence regarding an object that the autonomous vehicle was following or the lane width estimated by the vehicle may have shrunk due to a false positive detection of steam leaving a manhole cover. Example process 400 may generate a plain statement based at least in part on the trace and/or determination that a change occurred that changed the final output, the trajectory. The plain statement may include, for example "The vehicle decided to change lanes because the estimated lane width was too small for the vehicle due to detecting a new object in the lane."

Figure 5:
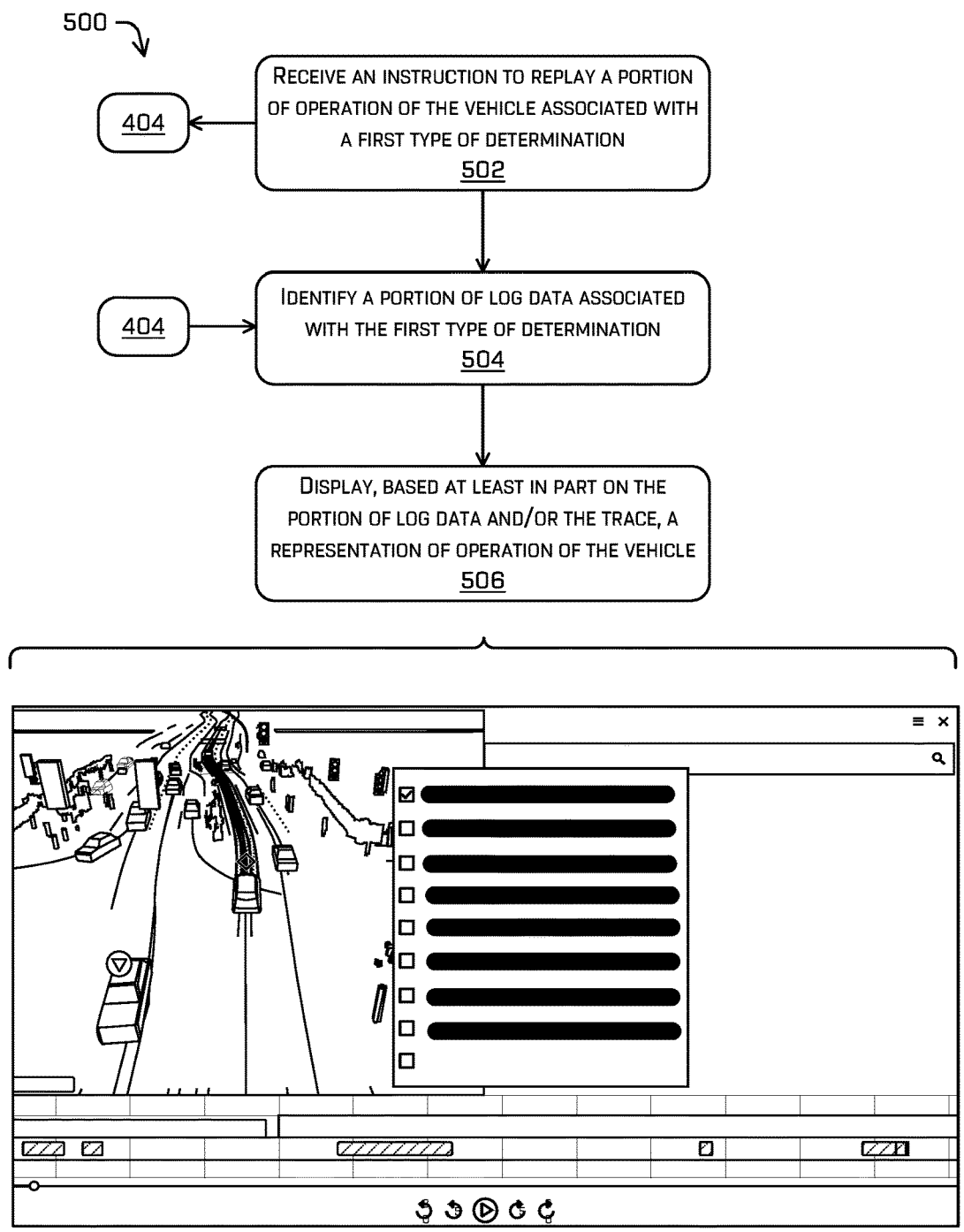
FIG. 5 illustrates a flow diagram of an example process for identifying a portion of log data associated with a trace and/or displaying a representation of vehicle operation associated with the trace.

Example Processes for Replaying Portions of Log Data Attributable to a Determination FIG. 5 illustrates a flow diagram of an example process 500 for identifying a portion of log data associated with a trace and/or displaying a representation of vehicle operation associated with the trace. In some examples, example process 500 may occur on a remote computing device, as part of troubleshooting, ensuring a patch or new component is working properly, and/or the like.

At operation 502, example process 500 may comprise receiving an instruction to replay a portion of operation of the vehicle associated with a first type of determination. For example, the instruction may be received responsive to a user's selection of a user interface element identifying the type of determination. As discussed above, the type of determination may be indicated by a name of the output of a component (e.g., "double-parked vehicle exception," "double-parked vehicle exception=yes," "new object detected," "emergency maneuver") or it may be broader than the name to encompass outputs of all sub-components of a particular component or system (e.g., trajectory generating pipeline components, sub-components of the planning component). In at least one example, a user may be able to identify the type of determination generally and/or a value, state, output, and/or output range thereof. In other words, the user may be able to identify any time the double-parked vehicle exception component output an exception, any time the minimum distance rule component output a threshold greater than a specified distance or a distance within a specified range, etc.

In some examples, operation 502 may comprise determining one or more components associated with the determination type and, in at least one example, operation 502 may cause a trace to be generated (operation 404) associated with a component determined to be associated with the determination type. In some examples, the depth of the trace may be identified via a user interface and/or a default trace depth may be used. In some instances, different types of determinations may be associated with different default trace depths.

At operation 504, example process 500 may comprise identifying a portion of log data associated with the first type of determination. Operation 504 may comprise determining one or more entries in the decision registry with the first type of determination and/or the trace that may have been generated at operation 404 based at least in part on operation 502. In some examples, operation 504 may comprise retrieving log data identified by the decision registry entries identified. The trace used may include a downstream trace and/or an upstream trace. For example, if the component is a low-level component, it's output may not be conducive to a visual or other user friendly representation—the component may just output machine code, a floating value, or the like, for example. So, operation 504 may comprise using a downstream trace to identifying component(s) that may have been influenced by the output of the component of interest identified at operation 502. In some examples, such output(s) may have been determined at a time later than a time at which output of the component of interest was determined. This may increase the reliability of the representation of the log data generated at operation 506 as truly being influenced by the output of the component of interest by removing any time drift, particularly for asynchronous systems.

At operation 506, example process 500 may comprise displaying, based at least in part on the portion of log data and/or the trace, a representation of operation of the vehicle associated with the first type of determination. Operation 506 may comprise generating a simulated representation of the environment and/or the vehicle based at least in part on the log data. The trace may be used to identify data sufficient for reconstructing the environment and vehicle state and/or interactions. For example, the first type of determination may be the estimated distance to the nearest object. Although the estimated distance to the nearest object may be a value that changes over time that could be graphed, this value alone is insufficient to show how the autonomous vehicle operated.

A downstream trace from a component that determined the estimated distance to the nearest object may result in identifying the trajectory that the autonomous vehicle implemented as a result, even though the actual trajectory determination may be removed by multiple intermediate components. This trajectory and/or other log data associated therewith may be used to generate a simulated representation of movement of the vehicle in the environment. An upstream trace from the component may identify sensor data and/or perception data upon which the estimated distance was based at least in part. This sensor data and/or perception data may be used to generate a simulated representation of the environment and where the autonomous vehicle was in the environment.

Figure 6:
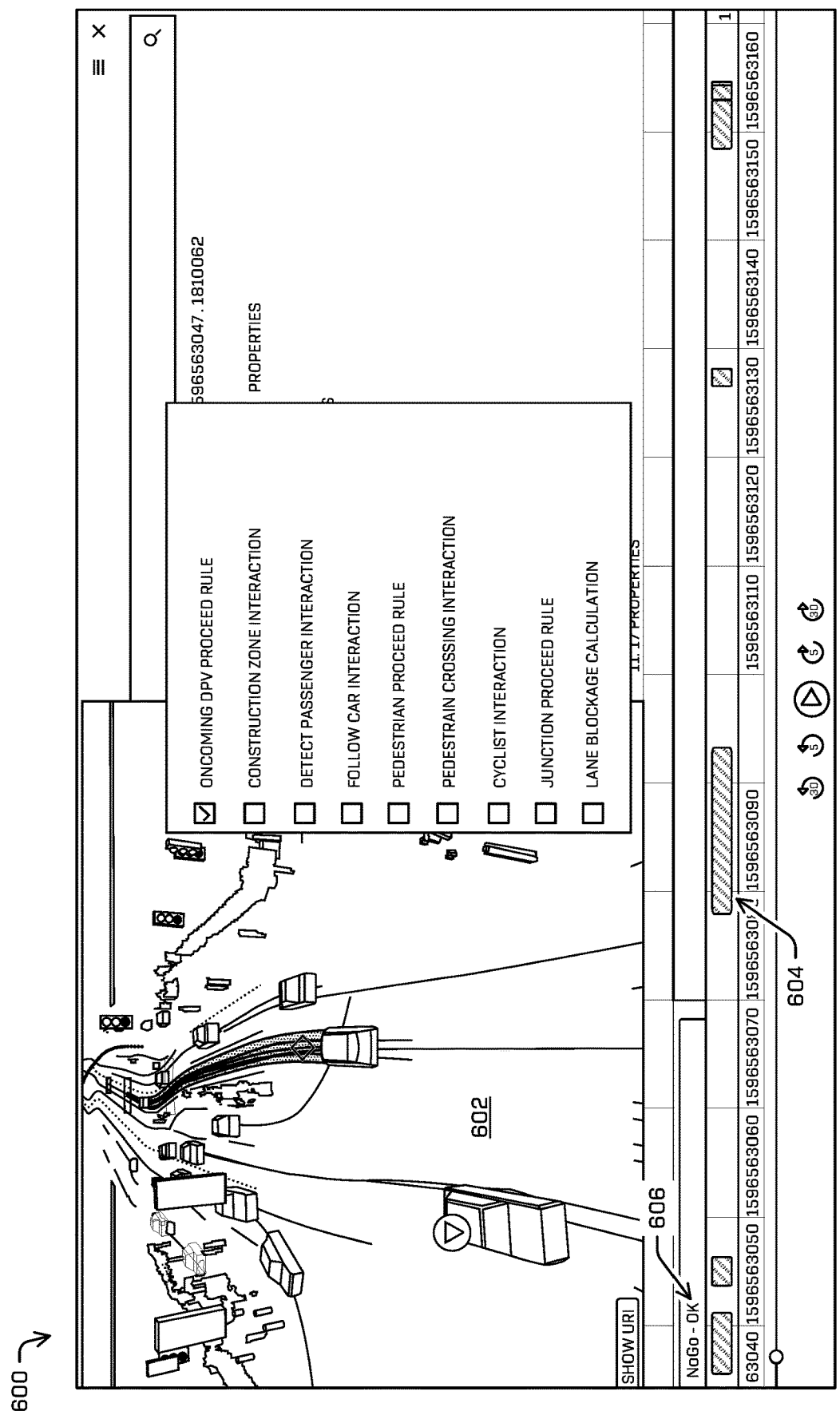
FIG. 6 illustrates a flow diagram of an example process for determining, using the decision registry, a portion of a component that has been tested sufficiently and preventing or mitigating use of portions of the component that have not been used sufficiently.

FIG. 6 illustrates an example user interface 600 for displaying a representation of vehicle operation associated with a data structure type and/or trace. In the depicted example, a user has selected a user interface element associated with a determination type, "oncoming DPV proceed rule," to identify and present a representation of vehicle operations associated with any interaction where the vehicle approached a double-parked vehicle. Based at least in part on executing process 500, the representation generated may comprise a visual representation of the vehicle and the environment (602); a timeline indicating portion(s) of the log data and/or decision registry that are associated with the selected determination type (e.g., as determined according to example process 500), indicated as a hashed block 604; and a selection 606 of a particular state for the determination type (i.e., "NoGo—OK" in the given example).

Figure 7:
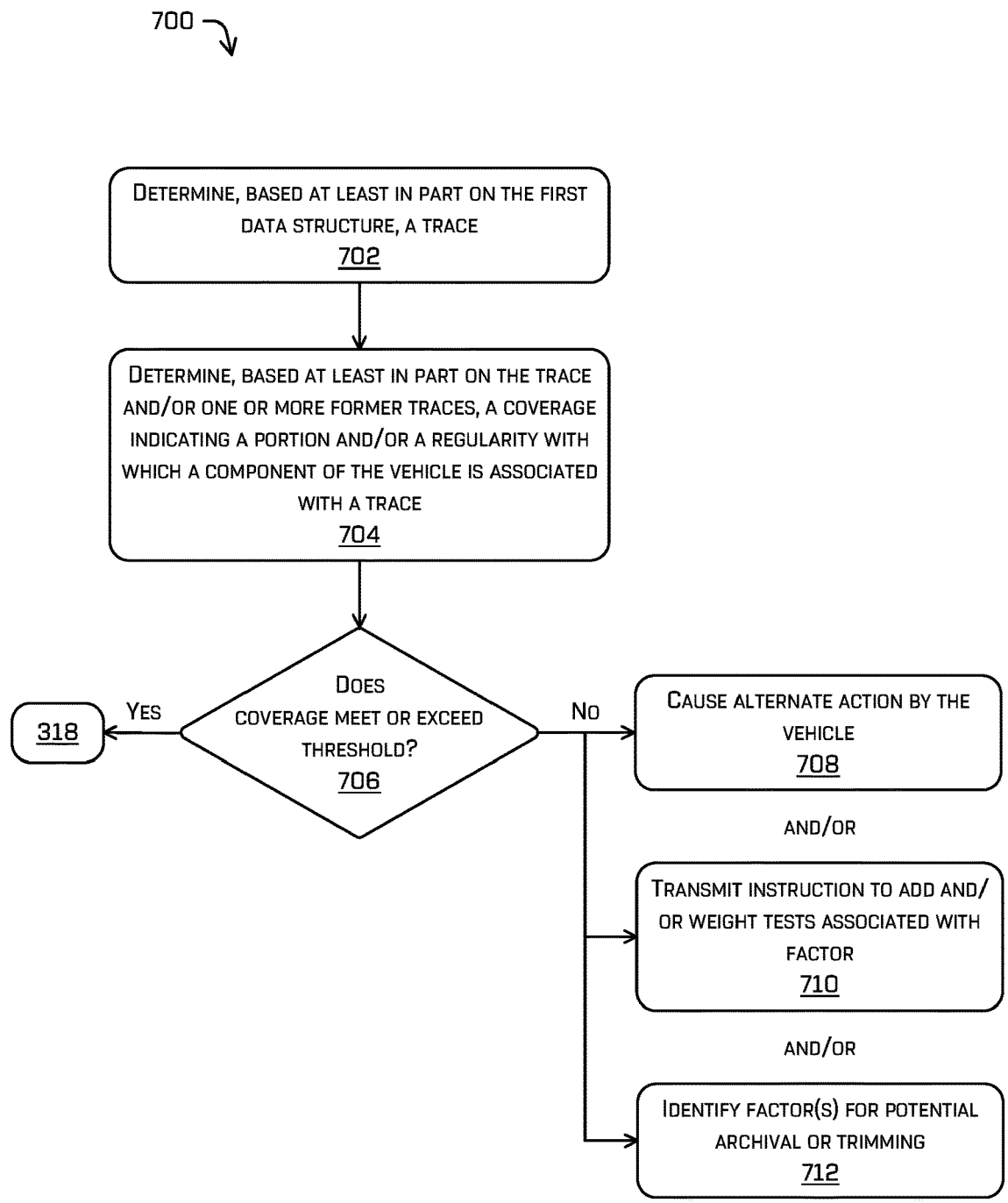
FIG. 7 illustrates an example user interface for displaying a representation of vehicle operation associated with a data structure type and/or trace.

Example Process for Determining Component Coverage and Controlling the Vehicle Based Thereon FIG. 7 illustrates a flow diagram of an example process 700 for determining, using the decision registry, a portion of a component that has been tested sufficiently and preventing or mitigating use of portions of the component that have not been used sufficiently. In some examples, example process 700 may be initiated based at least in part on operation 304—a determination made by any of the components of the autonomous vehicle. In an additional or alternate example, example process 700 may be initiated based at least in part on receiving user input identifying the first component, such as during part of a code cleaning operation to trim unused portions of code and/or hardware out of the pipeline. Example process 700 may therefore be conducted on-vehicle or on a remote computing device, depending on the use case—at least part of example process 700 may be used in conjunction with one or more simulations and/or in conjunction with one or more on-vehicle executions. In at least one example, example process 700 may be used to validate an update or revision to the vehicle. For example, if the coverage is not sufficient, as discussed herein, the update or revision to the vehicle, such as modifying a component of the vehicle, may be prevented from being accomplished. Otherwise, if the coverage is sufficient, the update or other revision may be transmitted to the vehicle along with instructions to implement the update. Or, in instances where the revision is physical, an authorization to accomplish the update may be transmitted to a robotics component or mechanic's computing device to accomplish the update or revision.

At operation 702, example process 700 may comprise determining, based at least in part on the first data structure (generated at operation 306), a trace, according to any of the techniques discussed herein. In some examples, operation 702 may occur live on the vehicle as it is operating so the trace may be an upstream trace, although it is possible for the trace to include at least some portion of a downstream trace. However, in one example, the trace is an upstream trace. In another example, the trace may be both an upstream trace and a downstream trace, such as when example process 700 is conducted at a remote computing device or for additional purposes beyond the operations of example process 700, such as any of the other process(es) discussed herein.

In some examples, operation 702 may comprise identifying the first component with which the first data structure is associated as the component of interest.

At operation 704, example process 700 may comprise determining, based at least in part on the trace and/or one or more former traces, a coverage indicating a portion of a component and/or a regularity with which a component of the vehicle is associated with a trace and/or activated. Determining the coverage may comprise amalgamating a count of the factor(s) identified by data structures generated in association with a specific output of a component and/or of the specific output itself. For example, the decision registry may determine a number of times a first factor is identified in data structures generated in association with a first type of output of a first component, a number of times a second factor is identified in data structures generated in association with the first type of output of the first component, and so on. In at least one example, the coverage may be indicated by the trace by way of weights of a directed graph indicating a frequency with which or a factor is identified by data structures generated in association with a component of interest and/or a specific output type.

At operation 706, example process 700 may comprise determining whether the coverage meets or exceeds a threshold. Operation 706 may comprise retrieving a factor identified by the first data structure—i.e., the factor(s) identified by the data structure that was generated for the first output of the first component, which may be an n-th output (where n is a positive integer great than one) in a set of outputs generated by the first component—and determining whether coverage associated with the factor meets or exceeds a threshold. Functionally, this may mean checking a number of times the factor has been identified by previously generated data structures in association with the first component and/or a same type of output as the first output. This process may be repeated for multiple factors of the first data structure if multiple factors are identified by the first data structure. In cases where a data structure identifies multiple factors, operation 706 may additionally comprise determining which factor is least used (i.e., has a lowest count) and determining whether to proceed to operation 304 or 708 based on the least used factor. In an additional or alternate example, an ML model may be trained to determine a confidence score associated with the factor(s) identified by the first data structure and operation 706 may determine whether that confidence score meets or exceeds a confidence threshold.

In other words, operation 706 may be used to test whether the factor(s) being relied upon by the first determination have been sufficiently tested and/or used for the first determination to be reliable and/or whether a particular factor is still being used in order to make a particular determination. For example, in the latter case, as the software and/or hardware is upgraded on the vehicle over time, determinations may rely on new sources of data or new technology to make the determination in a better way. This may mean that, in some cases, former components may no longer be relied upon for their outputs and the software and/or hardware devoted to that output is deadweight that is using energy, memory, physical space, computational cycles, etc. unnecessarily. Operation 706 may be used to identify such components.

In some examples, operation 706 may additionally or alternatively comprise determining whether the trace shape has been encountered before and, if not or if the difference between the trace shape and former trace shape(s) meets or exceeds a threshold difference, example operation 700 may transition to operation 708, 710, and/or 712. Former traces may be used to generate a heat map of former trace shapes. A trace shape may include a visual representation and/or the graph pattern associated with a trace. In an example where the trace shape includes a visual representation, such a visual representation (e.g., an image) may be used by an ML model to determine a difference and/or similarity score between the current trace and the former trace(s). This may allow operation 706 to not only determine whether a component has previously been relied upon, but also whether the combination of factor(s) indicated by the first determination has been seen, tested, and/or validated before.

If the coverage meets or exceeds a threshold, example process 700 may transition to operation 318—controlling the autonomous vehicle based at least in part on the first determination. Otherwise, if the coverage does not meet or exceed the threshold, example process 700 may transition to operation 708, 710, and/or 712.

At operation 708, example process 700 may comprise causing an alternate action by the vehicle, e.g., instead of controlling the vehicle based at least in part on the first determination. Operation 708 may occur during an instance where example process 700 is being executing on the vehicle, whether in a simulation or real life. Causing an alternate action may comprise changing control of the vehicle compared to relying on the first determination, causing one or more components to re-execute using new data or former data with new weight(s), transmitting a request to a teleoperations device for teleoperations assistance, or the like.

At operation 710, example process 700 may comprise transmitting an instruction to add and/or weight the frequency of tests associated with factor(s) that did not meet or exceed the threshold. Operation 710 may be the result of using operation 706 to identify which component(s) need more testing and may comprise increasing the frequency or likelihood of testing the components associated with the factor(s) that did not meet or exceed the threshold. In some examples, this may include running simulations that would rely on such component(s) during the simulation and/or changing weights associated with a scenario data generator of the simulation component such that the scenario data generator skews stochastically generated simulation parameters towards simulations that would test such component(s).

At operation 712, example process 700 may comprise identifying components associated with the factor(s) that do not meet or exceed the threshold as being candidates for archival and/or trimming from the current version of the vehicle. For example, this identification may cause a notification to be transmitted to a computing device associated with a user that is associated with permissions to modify the particular component of the vehicle identified. Based at least in part on receiving user input, the component may be maintained as it is, marked for further review, archived (e.g., removed from the current vehicle but retained on a remote computing device), and/or removed physically.

Example Process for Determining Scene Complexity

Figure 8:
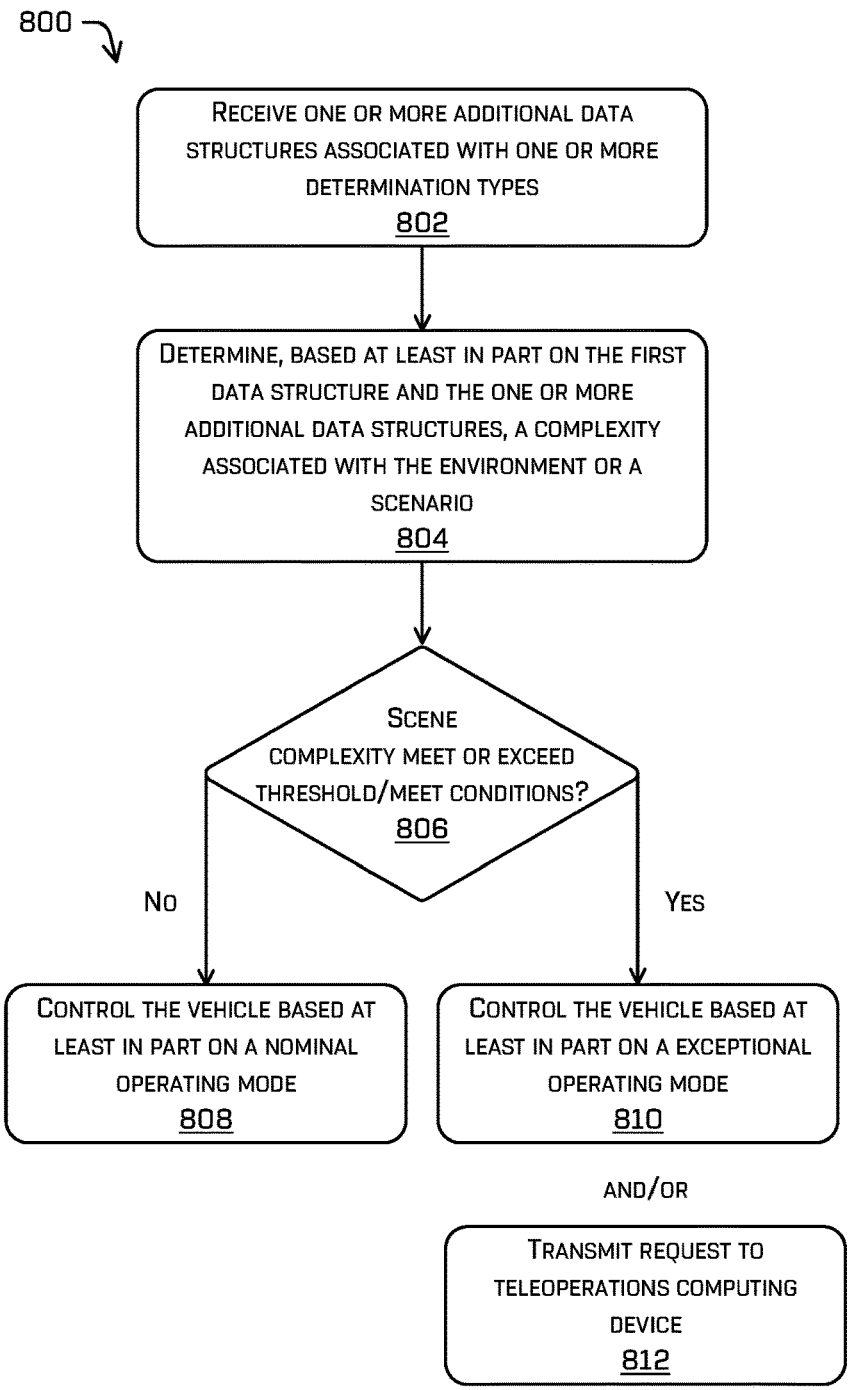
FIG. 8 illustrates a flow diagram of an example process for determining the complexity of an environment or scenario based at least in part on one or more data structure generated according to the techniques described herein.

FIG. 8 illustrates a flow diagram of an example process for determining the complexity of an environment or scenario based at least in part on one or more data structure generated according to the techniques described herein. In some examples, example process 800 may occur on-vehicle or as a part of evaluation or training of component(s) of the autonomous vehicle.

At operation 802, example process 800 may comprise receiving one or more additional data structures associated with one or more determination types. The additional data structures may be generated in association with any other component at a first time and, in at least one example, may include all the data structures generated at a first time.

At operation 804, example process 800 may comprise determining, based at least in part on the first data structure and the one or more additional data structures, a complexity associated with the environment or a scenario. The complexity may be a value indicating a difficulty of accurately and efficiently operating the vehicle in the scenario that the vehicle has encountered. The complexity may be a better indication of this difficulty than just an attribute of the environment, such as curvature or number of the roadway(s), or the number of objects therein. In some examples, the complexity may be based at least in part on a number of decision registry entries generated at a specific time and/or over a time window. For example, the complexity may be a value that is based at least in part on a total number of decision registry entries, an average number of decision entries, a number of decision of a particular type (e.g., in evaluating a complexity of a particular aspect of the scenario, such as the complexity of handling a roadway junction, pedestrian interactions, etc.), an average, moving average, and/or standard deviation.

At operation 806, example process 800 may comprise determining whether the complexity meets or exceeds a threshold and/or meets conditions specified by a rule set. In the latter example, instead of or in addition to determining whether the complexity meets a limit, operation 806 may comprise determining whether the complexity meets a set of conditions that may take into consideration other factors besides complexity, such as a time of day, sensor status (e.g., all sensors functional, sensors functional but the reliability of one type of sensor is degraded due to environmental conditions, one or more sensors or connections thereto are damaged), whether another component has recommended transmitting a request to a teleoperations device, and/or the like.

Regardless, if the complexity meets or exceeds the threshold and/or the conditions are met, example process 800 may transition to operation 808; otherwise, example process 800 may transition to operation 810.

At operation 808, example process 800 may comprise controlling the vehicle based at least in part on a nominal operating mode. Operation 808 may comprise using a first (nominal) planning component for controlling the vehicle and/or providing the complexity as an input to the planning component. In some examples, the planning component may use the complexity as a tie-breaker, as input to various ML models of the planning component's pipeline, and/or to weight various components of the planning component. In some examples, the complexity may heavily influence determinations of whether to send a request to a teleoperations device for teleoperations assistance, etc.

Whereas, at operation 810, example process 800 may comprise controlling the vehicle based at least in part on an exceptional operating mode. Operation 810 may comprise outputting an indication that the complexity has met or exceeded a threshold complexity, causing an alternate planning component to be used in addition to or instead of the nominal planning component, reallocating energy, memory, and/or computational allocations for different components, etc. In some examples, operation 810 may comprise reducing a top-speed rule used by the planning component to generate trajectories, resulting in potentially reducing the speed at which the vehicle is moving.

In some examples, reallocation of computational and/or energy resources may be based at least in part on a type and/or number of decision registry entries. In other words, reallocation (e.g., load balancing based at least in part on the complexity) may be accomplished to reduce resources provided to components with a lower than average or lower than a threshold number of decision registry entries (a temporarily "reduced capacity component") and increase resources provided to components with a greater than average or equal to or greater than a threshold number of decision registry entries (a temporarily "increased capacity component"). This may result, for example, in increasing a sample rate, resolution, number of active sensors, power supply, computational cycles, or the like accomplished by or accessible to a component. In some instances, based at least in part on the reallocation, an additional or alternate component may be used in association with a reduced capacity component or an increased capacity component. For example, a more rudimentary component may be used instead of a reduced capacity component and/or an additional component and/or a more computationally-intensive component may be used in addition to or instead of the increased capacity component.

At operation 812, example process 800 may additionally or alternatively comprise transmitting a request to a teleoperations device for teleoperations assistance.

In additional or alternate examples, trends in complexity may be used as part of determining a prediction associated with a detected object. In other words, the complexity value(s) may be provided to a prediction system of the perception component and used to improve prediction. In some examples, prediction may be based at least in part on a data structure.

Figure 9:
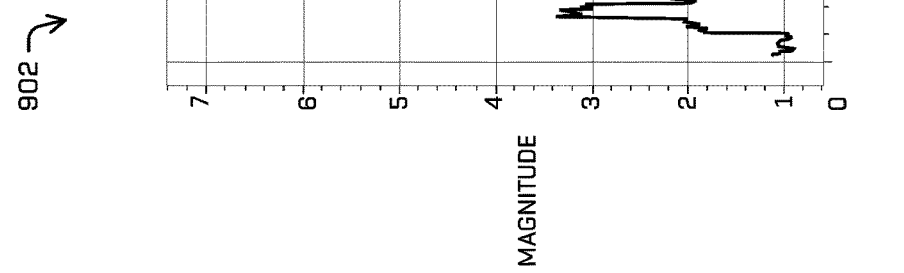
FIG. 9 illustrates two graphs by which scenario complexity may be determined using the data structures described herein.
Figure 9:
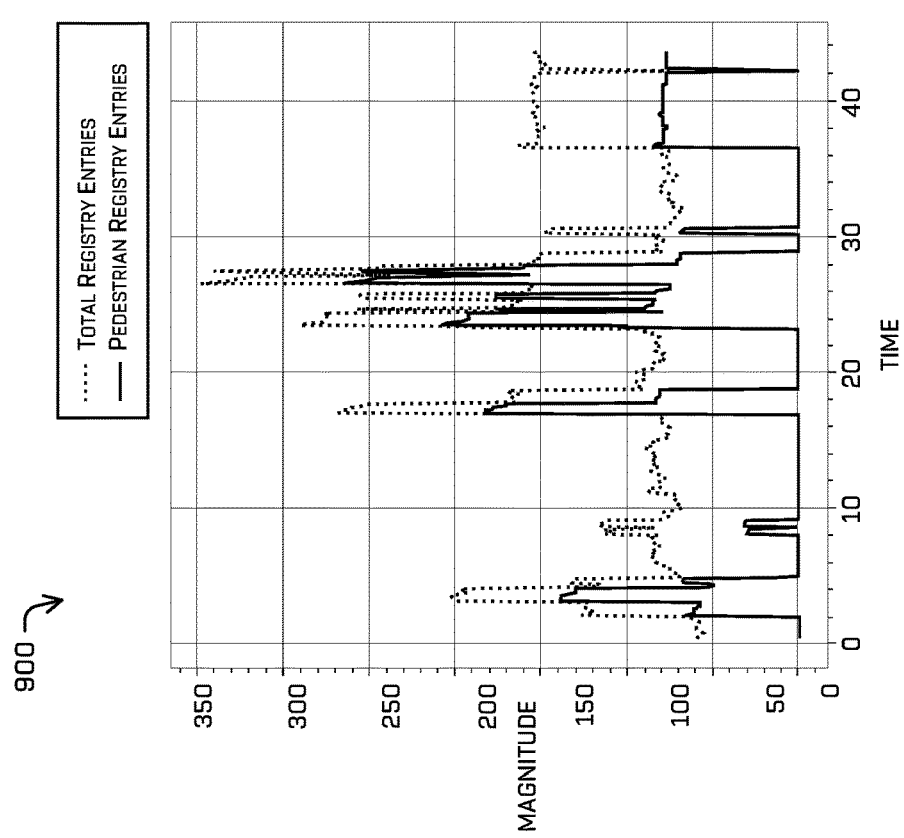

FIG. 9 illustrates two graphs by which scenario complexity may be determined using the data structures described herein. For example, graph 900 depicts a total number of decision registry entries over time in a dashed line and a total number of decision registry entries associated with pedestrians in a solid line. In the latter example, the decision registry entries associated with pedestrians may be any decision registry entries having a upstream trace that identifies a pedestrian object detection or, in an additional or alternate example, the decision registry entries associated with pedestrians may be an output type or name. Graph 902 depicts an average number of registry entries per detected object (e.g., as determined using trace(s)), which may be an additional or alternate variable for determining complexity.

Figure 10A:
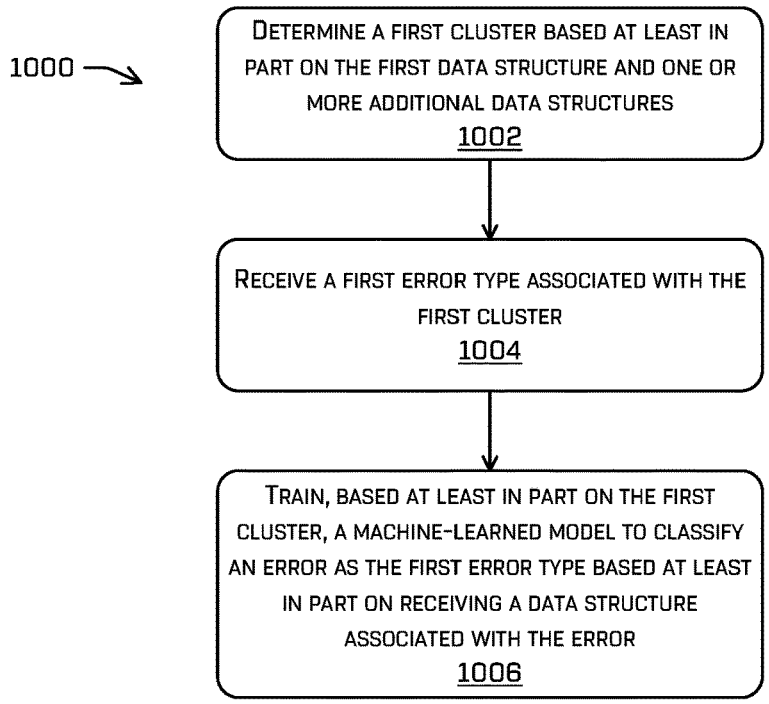
FIG. 10A illustrates a flow diagram of an example process for training a machine-learned (ML) model to determine an error type associated with an error based at least in part on the data structure(s) generated according to the techniques discussed herein.

Example Processes for Training and/or Using an ML Model to Detect and/or Classify Errors FIG. 10A illustrates a flow diagram of an example process 1000 for training a machine-learned (ML) model to determine an error type associated with an error based at least in part on the data structure(s) generated according to the techniques discussed herein. In some examples, example process 1000 may occur on-vehicle and/or at a remote computing device.

At operation 1002, example process 1000 may comprise determining a first cluster based at least in part on the first data structure and one or more additional data structures. For example, determining the cluster may comprise applying k-means, k-medians, expectation maximization (EM), hierarchical, density-based spatial clustering, and/or the like. In some examples, to cluster the data structures the data structures may first be represented by a set of values, variables, visual representations, and/or functions, and/or projected into a representative space. In some examples, the clustering may additionally or alternatively be based on an upstream and/or a downstream trace associated with the first data structure. This may improve the accuracy of the clustering, as a first data structure and a second data structure may both be associated with a same component, a same output type from that component, and a same output value but have different traces/trace patterns and be associated with different error types.

At operation 1004, example process 1000 may comprise receiving a first error type associated with the first cluster. For example, the first error type may be received based at least in part on user input provided via a user interface that may also represent the first cluster and/or other clusters to the user. In some examples, when an error is identified, whether according to the techniques discussed herein or according to data labeling/supervision, this data may be appended to any data structure(s) associated with the error, which may include component(s) identified by an upstream and/or downstream trace in some examples. In such an example, the error indicated by a data structure may be taken into account during clustering or the clustering may be skipped in some examples in preference for a purely supervised machine-learning technique. In an additional or alternate example, operation 1004 may comprise an unsupervised ML model training technique and receiving a label may not be necessary. For example, operation 1004 may comprise determining the error type associated with a cluster or determining an error type associated with one or more data structures of the decision registry.

At operation 1006, example process 1000 may comprise training, based at least in part on the first cluster and/or first error type, a machine-learned (ML) model to classify an error as the first error type based at least in part on receiving a data structure associated with the error. In some examples, the ML model may be trained to map any received data structures to one of one or more clusters determined at operation 1002. Upon mapping the data structure to one of the clusters, the ML model may output an error type associated with that cluster.

Figure 10B:
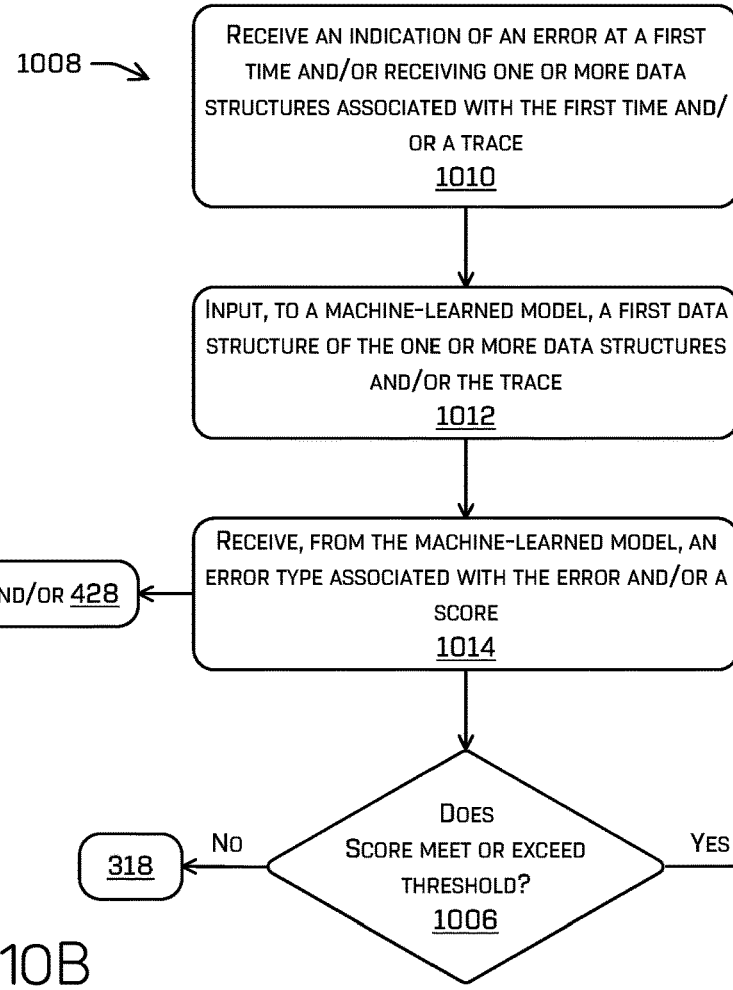
FIG. 10B illustrates a flow diagram of an example process for using the ML model to determine an error type associated with an error based at least in part on one or more data structures and/or a trace.

FIG. 10B illustrates a flow diagram of an example process 1008 for using the ML model to determine an error type associated with an error based at least in part on one or more data structures and/or a trace. In some examples, example process 1000 may occur on-vehicle and/or at a remote computing device.

At operation 1010, example process 1008 may comprise receiving an indication of an error at a first time and one or more data structures associated with the first time and/or a trace. For example, operation 1010 may be initiated based at least in part on detection of an error, receiving an indication that an error exists (e.g., based at least in part on user input at a user interface presenting a portion of log data), generation of a data structure, and/or generation of a trace. In other words, example process 1008 may be used in a variety of scenarios: when an error has already been discovered, either by the vehicle or by a user; and/or in order to discover the existence of an error by auditing the decision registry as entries are generated. In the former example, example process 1008 may be initiated based at least in part on receiving the error. The error may be, for example, receiving an indication that a request is being sent to teleoperations, determining that a trajectory generated by the autonomous vehicle fails a checklist or otherwise isn't suitable, etc. In an example where an error is received, data structure(s) associated with a time stamp associated with the error may be retrieved and/or trace(s) generated to identify additional component(s) and/or to generate a trace shape for clustering.

Whereas, in the latter example (decision registry auditing), example process 1008 may be initiated based at least in part on generation of a data structure and/or a trace. Since many entries may be generated in a single computational tick, example process 1008 may be initiated at intervals or for particular data structures and/or traces. For example, the double-parked vehicle component may be audited whenever an exception is output and the double-parked vehicle component may be audited more frequently than a component that generates an estimated distance to an object. In some examples, a component that generates a distance estimate may not be audited at all unless that component is identified by a trace.

At operation 1012, example process 1008 may comprise inputting, to an ML model, a first data structure of the one or more data structures and/or a trace associated therewith. In some examples, the first data structure and/or the trace may need to be transformed before providing either or both of them as input to the ML model. For example, a portion of the first data structure and/or the trace may be converted into a value, function, visual representation, or the like.

At operation 1014, example process 1008 may comprise receiving, from the ML model, an error type associated with the error and/or a score associated with the error type. For example, the score may be a confidence interval associated with the error type, indicating a likelihood (e.g., a posterior probability) that the error type is correct and/or extant, in the case of component output auditing. In an example where example process 1008 is conducted as part of component output auditing, if the score does not meet or exceed a threshold, example process 1008 may transition to operation 318 without taking further action, although in some cases example process 1008 may store the error type and score with the first data structure and/or the trace to generate historical data that may be used to evaluate and/or update the ML model. If the score meets or exceeds a threshold or if example process 1008 is conducted based at least in part on receiving an error, example process 1008 may transition to operation(s) 428, 708, 810, and/or 812.

Example Clauses

A. A method comprising: receiving data associated with autonomous operation of a vehicle in an environment; determining, by a first component from among a plurality of components of the vehicle and based at least in part on the data: an output for the first component, wherein the output is associated with the autonomous operation of the vehicle; and ancillary data identifying one or more outputs of each of one or more of the plurality of components; and populating a data structure of a plurality of data structures based at least in part on the output and the ancillary data, wherein another one of the plurality of data structures is associated with a second output of a second component of the plurality of components; determining, based at least in part on the plurality of data structures, a trace representing at least one of a first characterization of the factors that influenced the output of the first component or a second characterization of the manner in which the output affected the second output of the second component; and controlling the vehicle based at least in part on the trace.

B. The method of paragraph A, wherein the trace comprises the first characterization, the first characterization indicating a factor upon which the first output is based, wherein the factor indicates a third output of a third component of the vehicle and an interaction of the third output with the output C. The method of either paragraph A or B, further comprising: receiving an indication that the first output resulted in the error in operation of the vehicle; and determining, based at least in part on the trace, at least one of a component or a portion of code associated with the error.

D. The method of any one of paragraphs A-C, wherein the first output is associated with a first determination type and a first time and the method further comprises: determining one or more additional outputs at one or more times subsequent to the first time associated with the at least one of first determination type or the first component; determining a rate of change associated with a value or state indicated by the first output and the one or more additional outputs; determining that the rate of change meets or exceeds a threshold; determining, based at least in part on the trace, a component associated with the rate of change meeting or exceeding the threshold; and identifying the component in association with the error.

E. The method of any one of paragraphs A-D, wherein the first data structure is associated with a first time, the first output is a first type of determination, and the method further comprises: receiving a second data structure associated with a second output at a time subsequent to the first time; and determining, based at least in part on the first data structure and the second data structure, a measure of complexity of the environment; wherein controlling the vehicle is further based at least in part on the measure of complexity.

F. The method of any one of paragraphs A-E, wherein the first data structure is associated with a first time, the first output is associated with a first type of determination, and the method further comprises: receiving an instruction to replay a portion of operation of the vehicle associated with the first type of determination; identifying a portion of log data associated with the first type of determination, wherein the log data was generated by operation of the vehicle or execution of a simulation; and displaying, based at least in part on the portion of log data and the first type of determination, a representation of operation of the vehicle associated with the first type of determination.

G. A system comprising: one or more processors; and a memory storing processor-executable instructions that, when executed by the one or more processors, cause the system to perform operations comprising: receiving data associated with operation of a vehicle in an environment; determining, by a first component of the vehicle and based at least in part on the data, a first output, the first output indicating at least one of an operation to be performed by the vehicle, an operation to be performed by a sensor of the vehicle, or a state associated with the environment; and determining, based at least in part on determining the first output, a first data structure associated with the first output, wherein the first data structure indicates a factor upon which the first output is based, wherein the factor indicates at least one of a second output of a second component of the vehicle or a rule that was enforced associated with the first output.

H. The system of paragraph G, wherein the operations further comprise: receiving an indication that an error occurred in controlling the vehicle; and determining, based at least in part on the first data structure, a trace indicating at least one of an upstream output of an upstream component upon which the first output is based at least in part, or a downstream component that receives the first output as an input.

I. The system of paragraph H, wherein the operations further comprise: generating, based at least in part on the trace, a statement identifying the one or more components; and presenting the statement in association with a notification of the error.

J. The system of either paragraph H or I, wherein the operations further comprise: receiving an indication that the first output resulted in the error in operation of the vehicle; and determining, based at least in part on the trace, at least one of a component or a portion of code associated with the error.

K. The system of any one of paragraphs H-J, wherein the first output is associated with a first determination type and a first time and the operations further comprise: determining one or more additional outputs at one or more times subsequent to the first time; determining a rate of change associated with a value or state indicated by the first output and the one or more additional outputs; determining that the rate of change meets or exceeds a threshold; determining, based at least in part on the trace, a component associated with the rate of change meeting or exceeding the threshold; and identifying the component in association with the error.

L. The system of paragraph K, wherein determining the component associated with the rate of change comprises determining a portion of code or a portion of a component that causes an increase in the rate of change.

M. The system of any one of paragraphs G-L, wherein the first data structure is associated with a first time, the first output is a first type of determination, and the operations further comprise: receiving a second data structure associated with a second output at a time subsequent to the first time; and determining, based at least in part on the first data structure and the second data structure, a measure of complexity of the environment; and controlling the vehicle based at least in part on the measure of complexity.

N. The system of any one of paragraphs G-M, wherein the first data structure is associated with a first time, the first output is associated with a first type of determination, and the operations further comprise: receiving an instruction to replay a portion of operation of the vehicle associated with the first type of determination; identifying a portion of log data received from the vehicle associated with the first type of determination; and displaying, based at least in part on the portion of log data and the first type of determination, a representation of operation of the vehicle associated with the first type of determination.

O. The system of any one of paragraphs G-N, wherein the operations further comprise: determining a first cluster based at least in part on the first data structure and a second data structure associated with at least one of a first determination type or another determination type; receiving a first error type associated with the first cluster; and training, based at least in part on the first cluster, a machine-learned model to classify an error as the first error type based at least in part on receiving a data structure associated with the error.

P. One or more non-transitory computer-readable media storing processor-executable instructions that, when executed by one or more processors, cause the one or more processors to perform operations comprising: receiving data associated with operation of a vehicle; determining, by a first component of the vehicle and based at least in part on the data, a first output; determining, based at least in part on determining the first output, a first data structure associated with the first output, wherein the first data structure indicates a factor upon which the first output is based, wherein the factor indicates at least one of a second output of a second component of the vehicle; and determining, based at least in part on the first data structure, a trace indicating at least one of an upstream output of an upstream component upon which the first output is based at least in part, or a downstream component that receives the first output as an input.

Q. The one or more non-transitory computer-readable media of paragraph P, wherein the operations further comprise receiving an indication that an error occurred in controlling the vehicle; and determining, based at least in part on the first data structure, a trace indicating one or more components upstream from the first component.

R. The one or more non-transitory computer-readable media of either paragraph P or Q, wherein the operations further comprise: receiving an indication that the first output resulted in the error in operation of the vehicle; and determining, based at least in part on the trace, at least one of a component or a portion of code associated with the error.

S. The one or more non-transitory computer-readable media of any one of paragraphs P-R, wherein the first data structure is associated with a first time, the first output is a first type of determination, and the operations further comprise: receiving a second data structure associated with a second output at a time subsequent to the first time; determining, based at least in part on the first data structure and the second data structure, a measure of complexity of the environment; and controlling the vehicle based at least in part on the measure of complexity.

T. The one or more non-transitory computer-readable media of any one of paragraphs P-S, wherein the operations further comprise: determining one or more additional outputs at one or more times subsequent to the first time; determining a rate of change associated with a value or state indicated by the first output and the one or more additional outputs; determining that the rate of change meets or exceeds a threshold; determining, based at least in part on the trace, a component associated with the rate of change meeting or exceeding the threshold; and identifying the component in association with the error.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving data associated with autonomous operation of a vehicle in an environment;
   determining, by a first component from among a plurality of components of the vehicle and based at least in part on the data:
   (1) a first output of the first component, wherein the first output is associated with the autonomous operation of the vehicle; and
   (2) ancillary data identifying a second output of a second component (a) that the first component used to generate the first output and (b) from among one or more outputs received by the first component from one or more of the plurality of components;
   populating a first data structure of a plurality of data structures based at least in part on the first output and the ancillary data, wherein another one of the plurality of data structures is associated with the second output;

detecting, based at least in part on the first data structure, a transient determination associated with operating the vehicle, wherein detecting the transient determination is based at least in part on determining that a duration associated with the first output is less than a threshold duration;

determining, based at least in part on the plurality of data structures and the transient determination, a trace representing at least one of a first characterization of factors that influenced the first output of the first component or a second characterization of a manner in which the first output affected the second output of the second component; and controlling the vehicle based at least in part on the trace.

2. The method of claim 1, wherein the trace comprises the first characterization, the first characterization indicating a factor upon which the first output is based, wherein the factor indicates a third output of a third component of the vehicle and an interaction of the third output with the first output.

3. The method of claim 1, further comprising:
receiving an indication that the first output resulted in an error in operation of the vehicle; and
determining, based at least in part on the trace, at least one of a component or a portion of code associated with the error.

4. The method of claim 1, wherein the first output is associated with a first determination type and a first time and the method further comprises:
determining one or more additional outputs at one or more times subsequent to the first time associated with at least one of the first determination type or the first component;
determining a rate of change associated with a value or state indicated by the first output and the one or more additional outputs;
determining that the rate of change meets or exceeds a threshold;
determining, based at least in part on the trace, a component associated with the rate of change meeting or exceeding the threshold; and
identifying the component in association with an error.

5. The method of claim 1, wherein the first data structure is associated with a first time, the first output is a first type of determination, and the method further comprises:
receiving a second data structure associated with a third output at a time subsequent to the first time; and
determining, based at least in part on the first data structure and the second data structure, a measure of complexity of the environment;
wherein controlling the vehicle is further based at least in part on the measure of complexity and determining the measure of complexity is based at least in part on at least one of:
a first number of data structures determined at a first time or over a first time period,
a second number of outputs associated with the plurality of the data structures that indicate a first output type determined at a second time or over a second time period,
an average of the first number or the second number at the first time or second time, respectively,
a moving average of the first number or the second number over a portion of the first time period or the second time period, respectively, or
a standard deviation of the first number or the second number over the first time period or the second time period, respectively.

6. The method of claim 1, wherein the first data structure is associated with a first time, the first output is associated with a first type of determination, and the method further comprises:
receiving an instruction to replay a portion of operation of the vehicle associated with the first type of determination;
identifying a portion of log data associated with the first type of determination, wherein the log data was generated by operation of the vehicle or execution of a simulation; and
displaying, based at least in part on the portion of log data and the first type of determination, a representation of operation of the vehicle associated with the first type of determination.

7. The method of claim 1, wherein populating the first data structure based at least in part on the first output and the ancillary data comprises populating the first data structure with a factor upon which the first output is based, wherein the factor indicates at least one of:
a value of the second output that was used by the first component to determine the first output;
a first threshold was used to determine the first output, or
an interaction between the second output and a second threshold was used to determine the first output.

8. A system comprising:
one or more processors; and
a memory storing processor-executable instructions that, when executed by the one or more processors, cause the system to perform operations comprising:
receiving data associated with operating a vehicle in an environment;
determining, by a first component of the vehicle and based at least in part on the data, a first output, the first output indicating at least one of an operation to be performed by the vehicle, an operation to be performed by a sensor of the vehicle, or a state associated with the environment;
determining, based at least in part on determining the first output, a first data structure associated with the first output, wherein the first data structure indicates a factor upon which the first output is based, wherein the factor indicates at least one of that the first output was determined based at least in part on a second output of a second component of the vehicle from among a set of outputs received by the first component from a set of components or a rule that was enforced associated with the first output;
detecting, based at least in part on at least one of the first data structure, a transient determination associated with operating the vehicle, wherein detecting the transient determination is based at least in part on determining that a duration associated with the first output is less than a threshold duration;
modifying, as an updated component and based at least in part on the first data structure, at least one of the first component or the second component based at least in part on the transient determination; and
transmitting the updated component to the vehicle.

9. The system of claim 8, wherein the operations further comprise:
receiving an indication that an error occurred in controlling the vehicle; and determining, based at least in part on the first data structure, a trace indicating at least one of an upstream output of an upstream component upon which the first output is based at least in part, or a downstream component that receives the first output as an input.

10. The system of claim 9, wherein the operations further comprise:
generating, based at least in part on the trace, a statement identifying at least one of the upstream component or the downstream component; and
presenting the statement in association with a notification.

11. The system of claim 9, wherein the operations further comprise:
receiving an indication that the first output resulted in the error in operation of the vehicle; and
determining, based at least in part on the trace, at least one of a component or a portion of code associated with the error.

12. The system of claim 9, wherein the first output is associated with a first determination type and a first time and the operations further comprise:
determining one or more additional outputs at one or more times subsequent to the first time;
determining a rate of change associated with a value or state indicated by the first output and the one or more additional outputs;
determining that the rate of change meets or exceeds a threshold;
determining, based at least in part on the trace, a component associated with the rate of change meeting or exceeding the threshold; and
identifying the component in association with the error.

13. The system of claim 12, wherein determining the component associated with the rate of change comprises determining a portion of code or a portion of a component that causes an increase in the rate of change.

14. The system of claim 8, wherein the first data structure is associated with a first time, the first output is a first type of determination, and the operations further comprise:
receiving a second data structure associated with a third output at a time subsequent to the first time;
determining, based at least in part on the first data structure and the second data structure, a measure of complexity of the environment; and
controlling the vehicle based at least in part on the measure of complexity.

15. The system of claim 8, wherein the first data structure is associated with a first time, the first output is associated with a first type of determination, and the operations further comprise:
receiving an instruction to replay a portion of operation of the vehicle associated with the first type of determination;
identifying a portion of log data received from the vehicle associated with the first type of determination; and
displaying, based at least in part on the portion of log data and the first type of determination, a representation of operation of the vehicle associated with the first type of determination.

16. The system of claim 8, wherein the operations further comprise:
determining a first cluster based at least in part on the first data structure and a second data structure associated with at least one of a first determination type or another determination type;
receiving a first error type associated with the first cluster; and training, based at least in part on the first cluster, a machine-learned model to classify an error as the first error type based at least in part on receiving a data structure associated with the error.

17. One or more non-transitory computer-readable media storing processor-executable instructions that, when executed by one or more processors, cause the one or more processors to perform operations comprising:
receiving data associated with operating a vehicle;
determining, by a first component of the vehicle and based at least in part on the data, a first output;
determining, based at least in part on determining the first output, a first data structure associated with the first output, wherein the first data structure indicates a factor upon which the first output is based, wherein the factor indicates that the first output was determined based at least in part on a second output of a second component of the vehicle from among a set of outputs received by the first component from a set of components;
determining, based at least in part on the first data structure, a trace indicating at least one of an upstream output of an upstream component upon which the first output is based at least in part, or a downstream component that receives the first output as an input;
detecting, based at least in part on at least one of the first data structure, a transient determination associated with operating the vehicle; and
controlling the vehicle based at least in part on detecting the transient determination.

18. The one or more non-transitory computer-readable media of claim 17, wherein the operations further comprise:
receiving an indication that an error occurred in controlling the vehicle; and
determining, based at least in part on the first data structure, a trace indicating one or more components upstream from the first component.

19. The one or more non-transitory computer-readable media of claim 17, wherein the operations further comprise:
receiving an indication that the first output resulted in an error in operation of the vehicle; and
determining, based at least in part on the factor, at least one of a component or a portion of code associated with the error.

20. The one or more non-transitory computer-readable media of claim 17, wherein the first output is associated with a first time and the operations further comprise:
determining one or more additional outputs at one or more times subsequent to the first time;
determining a rate of change associated with a value or state indicated by the first output and the one or more additional outputs;
determining that the rate of change meets or exceeds a threshold;
determining, based at least in part on the trace, a component associated with the rate of change meeting or exceeding the threshold; and
identifying the component in association with an error.

21. The one or more non-transitory computer-readable media of claim 17, wherein the factor further indicates at least one of:
a value of the second output that was used by the first component to determine the first output;
a first threshold was used to determine the first output, or
an interaction between the second output and a second threshold was used to determine the first output.

* * * * *